United States Patent
Cleary et al.

(10) Patent No.: US 10,800,143 B2
(45) Date of Patent: Oct. 13, 2020

(54) GLASS LAMINATE STRUCTURES FOR HEAD-UP DISPLAY SYSTEM

(71) Applicant: CORNING INCORPORATED, Corning, NY (US)

(72) Inventors: Thomas Michael Cleary, Elmira, NY (US); Douglas Edmon Goforth, Painted Post, NY (US); Richard Sean Priestley, Painted Post, NY (US); ChuanChe Wang, Horseheads, NY (US); Aramais Zakharian, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 582 days.

(21) Appl. No.: 15/156,620

(22) Filed: May 17, 2016

(65) Prior Publication Data

US 2016/0257095 A1    Sep. 8, 2016

Related U.S. Application Data

(63) Continuation-in-part of application No. 14/638,224, filed on Mar. 4, 2015.
(Continued)

(51) Int. Cl.
*B32B 17/10* (2006.01)
*C03C 21/00* (2006.01)
(Continued)

(52) U.S. Cl.
CPC ........ *B32B 17/10137* (2013.01); *B32B 9/045* (2013.01); *B32B 17/064* (2013.01);
(Continued)

(58) Field of Classification Search
CPC .. B32B 3/26; B32B 3/263; B32B 7/12; B32B 17/06; B32B 17/064; B32B 17/10009;
(Continued)

(56) References Cited

U.S. PATENT DOCUMENTS 3,396,075 A    8/1968    Morris
3,558,415 A    1/1971    Rieser et al.
(Continued)

FOREIGN PATENT DOCUMENTS

EP    0420228    4/1991
EP    836108 A3    6/1999
(Continued)

OTHER PUBLICATIONS

Free ghost image and high transmittance optical thin film beam splitter for head-up display, Lee, C.-C., Tsai, S.-H., Kuo, C.-C., Chen, C.H., Teng, L.M., Luo, K.-T. 2011, Digest of Technical Papers—SID International Symposium 421, pp. 1451-1453 0.
(Continued)

*Primary Examiner* — Megha M Gaitonde

(57) ABSTRACT

Embodiments of a glass laminate structure comprising a non-strengthened glass sheet, a strengthened glass sheet, and at least one polymer interlayer intermediate the external and internal glass sheets are disclosed. The strengthened glass sheet can have a thickness ranging from about 0.3 mm to about 1.5 mm, the non-strengthened glass sheet can have a thickness ranging from about 1.5 mm to about 3.0 mm, and the polymer interlayer can have a first edge with a first thickness and a second edge opposite the first edge with a second thickness greater than the first thickness. The glass laminate structures provide advantageous optical properties. The glass laminate structure can be employed to provide a transparent display screen that minimizes image offset
(Continued)

between two images formed by two reflections at two surfaces of the strengthened internal glass sheet.

16 Claims, 19 Drawing Sheets

Related U.S. Application Data

(60) Provisional application No. 61/949,359, filed on Mar. 7, 2014.

(51) Int. Cl.
| | |
|---|---|
| *G02B 27/01* | (2006.01) |
| *B32B 17/06* | (2006.01) |
| *B32B 27/40* | (2006.01) |
| *B32B 27/30* | (2006.01) |
| *B32B 27/06* | (2006.01) |
| *B32B 9/04* | (2006.01) |
| *B32B 27/36* | (2006.01) |

(52) U.S. Cl.
CPC .... *B32B 17/10036* (2013.01); *B32B 17/1077* (2013.01); *B32B 17/10119* (2013.01); *B32B 17/10568* (2013.01); *B32B 17/10743* (2013.01); *B32B 17/10761* (2013.01); *B32B 17/10788* (2013.01); *B32B 27/06* (2013.01); *B32B 27/30* (2013.01); *B32B 27/306* (2013.01); *B32B 27/365* (2013.01); *B32B 27/40* (2013.01); *C03C 21/002* (2013.01); *G02B 27/01* (2013.01); *G02B 27/0101* (2013.01); *B32B 2270/00* (2013.01); *B32B 2307/558* (2013.01); *B32B 2307/584* (2013.01); *B32B 2307/732* (2013.01); *B32B 2457/20* (2013.01); *B32B 2605/006* (2013.01); *B32B 2605/08* (2013.01); *G02B 2027/0121* (2013.01); *G02B 2027/0194* (2013.01); *G02B 2027/0196* (2013.01); *Y10T 428/24612* (2015.01)

(58) Field of Classification Search
CPC ........ B32B 17/10165; B32B 17/10807; B32B 17/10036; B32B 17/10128; B32B 17/1055; B32B 17/10559; B32B 17/10752; B32B 17/1077; B32B 33/00; B32B 2605/006; B32B 2605/08; Y10T 428/24479; Y10T 428/24488; Y10T 428/24504; Y10T 428/24512; Y10T 428/24521; Y10T 428/24529; Y10T 428/24545; Y10T 428/24612; Y10T 428/24942; Y10T 428/2495; Y10T 428/24959; G02B 2027/0196
USPC ....... 428/156, 157, 159, 160, 161, 162, 164, 428/172, 212, 213, 214
See application file for complete search history.

(56) References Cited

U.S. PATENT DOCUMENTS

| | | | |
|---|---|---|---|
| 3,592,726 A * | 7/1971 | Blizard | B32B 17/10036 |
| | | | 428/215 |
| 3,751,238 A | 8/1973 | Grego et al. | |
| 5,013,134 A | 5/1991 | Smith | |
| 5,066,102 A | 11/1991 | Hirano | |
| 5,108,479 A | 4/1992 | Hirano | |
| 5,289,315 A | 2/1994 | Makita | |
| 5,496,621 A | 3/1996 | Kensuke | |
| 5,510,913 A | 4/1996 | Chikara | |
| 5,566,025 A | 10/1996 | Knoll et al. | |
| 5,624,763 A | 4/1997 | Malancon et al. | |
| 5,812,332 A | 9/1998 | Freeman | |
| 5,945,199 A | 8/1999 | Morin | |
| 6,042,947 A | 3/2000 | Asakura et al. | |
| 6,259,559 B1 | 7/2001 | Kobayashi | |
| 6,327,089 B1 | 12/2001 | Hosaki | |
| 6,414,796 B1 | 7/2002 | Muromachi | |
| 7,060,343 B2 | 6/2006 | Freeman | |
| 7,230,767 B2 | 6/2007 | Walck et al. | |
| 7,864,431 B2 | 1/2011 | Martin | |
| 8,075,983 B2 | 12/2011 | Masaki | |
| 8,367,216 B2 | 2/2013 | Fukatani | |
| 8,451,541 B2 | 5/2013 | Labrot et al. | |
| 8,487,277 B2 | 7/2013 | Labrot | |
| 8,519,362 B2 | 8/2013 | Labrot | |
| 8,764,923 B2 | 7/2014 | Durbin et al. | |
| 8,986,072 B2 | 3/2015 | Darcangelo et al. | |
| 2001/0044010 A1 | 11/2001 | Freeman | |
| 2003/0026964 A1 | 2/2003 | Muromachi | |
| 2003/0121287 A1 | 7/2003 | Chalk et al. | |
| 2006/0098466 A1 | 5/2006 | Chang | |
| 2007/0148472 A1 * | 6/2007 | Masaki | B32B 17/10036 |
| | | | 428/426 |
| 2008/0129073 A1 | 6/2008 | Nishikawa | |
| 2010/0214194 A1 | 8/2010 | Kanou | |
| 2010/0270908 A1 | 10/2010 | Suzuki | |
| 2010/0314900 A1 | 12/2010 | Labrot et al. | |
| 2011/0073773 A1 | 3/2011 | Labrot | |
| 2011/0088801 A1 | 4/2011 | Ramirez-Diaz | |
| 2012/0025559 A1 | 2/2012 | Offermann et al. | |
| 2012/0094084 A1 | 4/2012 | Fisher et al. | |
| 2012/0328843 A1 | 12/2012 | Cleary et al. | |
| 2013/0004719 A1 | 1/2013 | Thellier et al. | |
| 2013/0086948 A1 | 4/2013 | Bisson et al. | |
| 2013/0125589 A1 | 5/2013 | Dannoux et al. | |
| 2013/0125592 A1 | 5/2013 | Bisson et al. | |
| 2013/0127202 A1 | 5/2013 | Hart | |
| 2013/0295357 A1 | 11/2013 | Cleary et al. | |
| 2013/0295358 A1 | 11/2013 | Paulus et al. | |
| 2013/0319046 A1 | 12/2013 | Cleary et al. | |
| 2013/0323415 A1 | 12/2013 | Brackley et al. | |
| 2014/0087159 A1 | 3/2014 | Cleary et al. | |
| 2014/0087193 A1 | 3/2014 | Cites et al. | |
| 2014/0141217 A1 | 5/2014 | Gulati et al. | |
| 2014/0239034 A1 | 8/2014 | Cleary et al. | |
| 2014/0356604 A1 | 12/2014 | Borrelli et al. | |
| 2015/0064374 A1 | 3/2015 | Jain et al. | |
| 2015/0111016 A1 | 4/2015 | Fisher et al. | |
| 2015/0122406 A1 | 5/2015 | Fisher et al. | |
| 2015/0132538 A1 | 5/2015 | Cleary et al. | |
| 2015/0140301 A1 | 5/2015 | Fisher et al. | |
| 2015/0158275 A1 | 6/2015 | D'Errico et al. | |
| 2015/0158277 A1 | 6/2015 | Fisher et al. | |
| 2015/0174861 A1 | 6/2015 | Hasegawa et al. | |
| 2015/0232366 A1 | 8/2015 | Fredholm et al. | |
| 2015/0232367 A1 | 8/2015 | Joubaud et al. | |
| 2015/0251377 A1 | 9/2015 | Cleary et al. | |
| 2015/0274571 A1 | 10/2015 | Brennan et al. | |
| 2015/0321940 A1 | 11/2015 | Dannoux et al. | |
| 2016/0082705 A1 | 3/2016 | Fisher et al. | |
| 2016/0145139 A1 | 5/2016 | Frdholm et al. | |

FOREIGN PATENT DOCUMENTS

| | | |
|---|---|---|
| EP | 1800855 | 6/2007 |
| EP | 1958764 | 8/2008 |
| JP | 3257044 A | 11/1991 |
| JP | 51038840 A | 6/1993 |
| JP | 1993138840 A | 6/1993 |
| JP | 7215091 A | 8/1995 |
| JP | 8169258 A | 7/1996 |
| JP | 9329759 A | 12/1997 |
| JP | 2003252659 A | 9/2003 |
| JP | 2005156678 | 6/2005 |
| JP | 2005187271 A | 7/2005 |
| JP | 2005263517 A | 9/2005 |
| JP | 2011088801 A | 5/2011 |
| JP | 2011207645 A | 10/2011 |
| WO | 2008132368 A9 | 11/2008 |

(56) References Cited

FOREIGN PATENT DOCUMENTS

| WO | 2015031148 A1 | 3/2015 |
|----|---------------|--------|
| WO | 2015031151 A1 | 3/2015 |
| WO | 2015031594 A2 | 3/2015 |
| WO | 2015054112 A1 | 4/2015 |

OTHER PUBLICATIONS

New holographic polymeric composition based on plexiglass, polyvinyl butyral, and phenanthrenquinone, Matusevich, V., Tolstik, E., Kowarschik, R., Egorova, E., Matusevich, Y.I., Krul, L. 2013, Optics Communications 295 , pp. 79-83 2.

Application of DuPont photopolymer films to automotive holographic display, Nakazawa, N., Ono, M., Takeuchi, S., Sakurai, H., Hirano, M. 1998, Proceedings of SPIE—The International Society for Optical Engineering 3294 , pp. 182-193 2.

Design considerations of HUD projection systems applied to automobile industry, Betancur, J.A. 1 ; Osorio Gomez, G.2.

Patent Cooperation Treaty International Notification of Transmittal of the International Search Report and The Written Opinion of the International Searching Authority, international application No. PCT/US2015/019101: dated May 27, 2015, 12 pages.

Advantages of polymer and hybrid glass-polymer optics Doushkina, V. 2010Photonics Spectra 44 (4) 2.

Visibility of head up display (HUD) for automobiles Inuzuka, Y.1; Osumi, Y.1; Shinkai, H.1.

Advanced head-up display technology—the integrated HUD Coonrod, J.F.1; Ernstoff, M.N.

Yao et al; "Smarter Tourism—The Trends of Tourism Informatization"; Beijing Tourism Education Press; p. 85; (2013).

English Translation of CN201580021799.5 Office Action dated Jun. 21, 2018; 16 Pages; Chinese Patent Office.

Morita, K. et al., "Influence of Double Image on the Troublesomeness of a Head-Up Display for Use in Motor Vehicles." SAE Technical Paper Series; vol. 108; Section 6: Journal of Passenger Cars, Part 1; 12 Pages; 1999.

Muruganandam, R., "Heads Up Display"; SAE Technical Paper Series; 7 Pages; Aug. 5, 2007.

Sekisui Chemical Co. Ltd.; S-LEC for Automotice Use; 2 Pages; 2009; http://www.s-lecfilm.com/eng/product/auto/index.html.

English Translation of the Office Action in Corresponding Japanese Patent Application No. 2016555983; dated Feb. 13, 2019; Japan Patent Office; 4 Pgs.

\* cited by examiner

GLASS LAMINATE STRUCTURES FOR HEAD-UP DISPLAY SYSTEM

CROSS-REFERENCE TO RELATED APPLICATIONS

This application is a continuation-in-part application of and claims the benefit of priority under 35 U.S.C. § 120 of U.S. application Ser. No. 14/638,224 filed on Mar. 4, 2015, which claims the benefit of priority under 35 U.S.C. § 119 of U.S. Application Ser. No. 61/949,359, filed on Mar. 7, 2014, the contents of which are incorporated herein by reference in their entirety.

BACKGROUND

Glass laminate structures can be used as windows and glazings in architectural and transportation applications, including automotives, rolling stock and airplanes. As used herein, a glazing can be a transparent or semi-transparent part of a wall or other structure. Common types of glazings that are used in architectural and automotive applications include clear and tinted glass, including laminated glass. Laminated glazings comprising opposing glass sheets separated by a plasticized poly(vinyl butyral) (PVB) sheet, for example, can be used as windows, windshields, or sunroofs. In certain applications, glass laminate structures having high mechanical strength and sound-attenuating properties are desirable in order to provide a safe barrier while reducing sound transmission from external sources.

In many vehicular applications, fuel economy is a function of vehicle weight. It is desirable, therefore, to reduce the weight of glazings for such applications without compromising strength and sound-attenuating properties. In this regard, it can be advantageous for a glass laminate structure to be mechanically robust with respect to external impact events such as attempted forced entry or contact with stones or hail, yet suitably dissipate energy (and fracture) as a result of internal impact events such as contact with an occupant, for example, during a collision. Further, governmental regulations are demanding higher fuel mileage and lower carbon dioxide emissions for road vehicles. Thus, there has been an increased effort to reduce the weight of these vehicles while maintaining current governmental and industry safety standards. Non-glass window materials, such as polycarbonate, have been developed, which reduce vehicle weight but do not offer appropriate resistance to environmental, debris, and other concerns.

Additionally, there has been an effort in the industry to use automotive glazings with a Head-up or Heads-up Display (HUD). Conventionally, automotive windshields are manufactured using the float process; however, this process provides less than adequate clarity and draw lines that are created by friction between the molten glass and the molten tin during the manufacturing process. In an HUD application, e.g., where light is projected onto the glass windshield, these lines are visible. Further, conventional HUD systems can provide dual images or a ghost image due to thicknesses and lack of clarity of the glass sheets in a respective laminate structure.

Embodiments of the present disclosure, however, provide substantial weight reduction, safety compliance, effective durability and reduced laceration potential in the event of a vehicular crash. Embodiments also provide automotive glazings with superior optical properties, for example when used as part of a HUD system. In view of the foregoing, thin, light weight, high-clarity glazings that possess the durability and sound-damping properties associated with thicker, heavier glazings are desirable.

SUMMARY

The present disclosure relates generally to glass laminate structures, and more particularly to hybrid glass laminate structures comprising a strengthened external glass pane and a non-strengthened internal glass pane, a strengthened internal glass pane and a non-strengthened external glass pane, and strengthened internal and external glass panes. Such hybrid laminate structures may be characterized by low weight, good sound-damping performance, high impact resistance, and superior optical properties. In particular, the disclosed hybrid laminate structures can satisfy commercially-applicable impact test criteria for non-windscreen applications and can provide a clear screen to project a heads-up image to a driver, while minimizing the appearance of a ghost image. As used herein, the term "strengthened" may include chemically-strengthened, thermally strengthened (e.g., by thermal tempering), other techniques for strengthening glass or combinations thereof. As used herein, the term "non-strengthened" may include glass that is not chemically or thermally strengthened (but may include glass that is annealed).

In some embodiments, a glass laminate structure is provided comprising a non-strengthened external glass sheet, a strengthened internal glass sheet, and at least one polymer interlayer intermediate the external and internal glass sheets, where the internal glass sheet has a thickness ranging from about 0.3 mm to about 1.5 mm, such as from about 0.5 mm to about 1.5 mm, the external glass sheet has a thickness ranging from about 1.5 mm to about 3.0 mm, and the polymer interlayer has a first edge with a first thickness and a second edge opposite the first edge with a second thickness greater than the first thickness.

In additional embodiments, a glass laminate structure is provided comprising a non-strengthened internal glass sheet, a strengthened external glass sheet, and at least one polymer interlayer intermediate the external and internal glass sheets, where the external glass sheet has a thickness ranging from about 0.3 mm to about 1.5 mm, such as from about 0.5 mm to about 1.5 mm, where the internal glass sheet has a thickness ranging from about 1.5 mm to about 3.0 mm, and where the polymer interlayer has a first edge with a first thickness and a second edge opposite the first edge with a second thickness greater than the first thickness.

In further embodiments, a glass laminate structure is provided comprising a strengthened internal glass sheet, a strengthened external glass sheet, and at least one polymer interlayer intermediate the external and internal glass sheets, where the external and internal glass sheets each have a thickness ranging from about 0.3 mm to about 1.5 mm, such as from about 0.5 mm to about 1.5 mm, and where the polymer interlayer has a first edge with a first thickness and a second edge opposite the first edge with a second thickness greater than the first thickness.

In yet further embodiments, a glass laminate structure is provided comprising a non-strengthened glass sheet made by a float process, which may be, for example, soda-lime glass, a strengthened glass sheet made by a fusion draw process, which may be, for example, Gorilla® Glass, and at least one polymer interlayer intermediate the non-strengthened and strengthened glass sheets, wherein the strengthened glass sheet has a thickness that is less than a thickness of the non-strengthened glass sheet, for example is less than about 75%, less than about 50%, or less than about 25% of the thickness of the non-strengthened glass sheet. In various embodiments, the strengthened and non-strengthened glass sheets may be either external or internal, such that when the strengthened glass sheet is external, the non-strengthened glass sheet is internal, and when the non-strengthened glass sheet is external, the strengthened glass sheet is internal.

In yet further embodiments, a glass laminate structure is provided comprising two strengthened glass sheets made by a fusion draw process, which may be, for example, Gorilla® Glass, and at least one polymer interlayer intermediate the two strengthened glass sheets, wherein the strengthened glass sheets have thicknesses (independently) ranging from about 0.3 mm to about 1.5 mm, such as from about 0.5 mm to about 1.5 mm.

According to one aspect of the present disclosure, a glass laminate structure comprising a non-strengthened glass sheet; a strengthened glass sheet; and at least one polymer interlayer intermediate the non-strengthened and strengthened glass sheets; wherein the glass laminate structure exhibits a double image offset that is less than about 0.5 mm for a range of an angle of incidence for an illuminating light that spans 8 degrees or 10 degrees, is disclosed. According to further aspects, the strengthened glass sheet may have a thickness ranging from about 0.3 mm to about 1.5 mm and the non-strengthened glass sheet may have a thickness ranging from about 1.5 mm to about 3.0 mm. In yet further aspects, a glass laminate structure is disclosed wherein the glass laminate structure is an automotive windshield and the windshield comprises an image display region, and a double image offset is less than 0.4 mm in magnitude within an area of the image display region of the automotive windshield having a vertical extent greater than 30 cm.

According to further aspects, a glass laminate structure is disclosed comprising a non-strengthened glass sheet; a strengthened glass sheet; and at least one polymer interlayer intermediate the non-strengthened and strengthened glass sheets; wherein a thickness of the strengthened glass sheet is less than one half of a thickness of the non-strengthened glass sheet, and the glass laminate structure provides a reduction in ghost image of greater than about 50%, such as greater than about 70%, compared to a glass laminate structure comprising a strengthened glass sheet having substantially the same thickness as the non-strengthened glass sheet. According to further aspects, the strengthened glass sheet may have a thickness ranging from about 0.3 mm to about 1.5 mm and the non-strengthened glass sheet may have a thickness ranging from about 1.5 mm to about 3.0 mm.

According to yet a further aspect of the present disclosure, a glass laminate structure comprising at least two strengthened glass sheets and at least one polymer interlayer intermediate the two strengthened glass sheets; wherein the glass laminate structure exhibits a double image offset that is less than about 0.5 mm for a range of an angle of incidence for an illuminating light that spans at least about 8 degrees, such as at least about 10 degrees, is disclosed. According to further aspects, the strengthened glass sheet may have a thickness ranging from about 0.3 mm to about 1.5 mm and the non-strengthened glass sheet may have a thickness ranging from about 1.5 mm to about 3.0 mm. In yet further aspects, a glass laminate structure is disclosed wherein the glass laminate structure is an automotive windshield and the windshield comprises an image display region, and a double image offset is less than 0.4 mm in magnitude within an area of the image display region of the automotive windshield having a vertical extent greater than 30 cm.

Additional features and advantages of the claimed subject matter will be set forth in the detailed description which follows, and in part will be readily apparent to those skilled in the art from that description or recognized by practicing the claimed subject matter as described herein, including the detailed description which follows, the claims, as well as the appended drawings.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF THE DRAWINGS

For the purposes of illustration, there are forms shown in the drawings that are presently preferred, it being understood, however, that the embodiments disclosed and discussed herein are not limited to the precise arrangements and instrumentalities shown.

DETAILED DESCRIPTION

Figure 1:
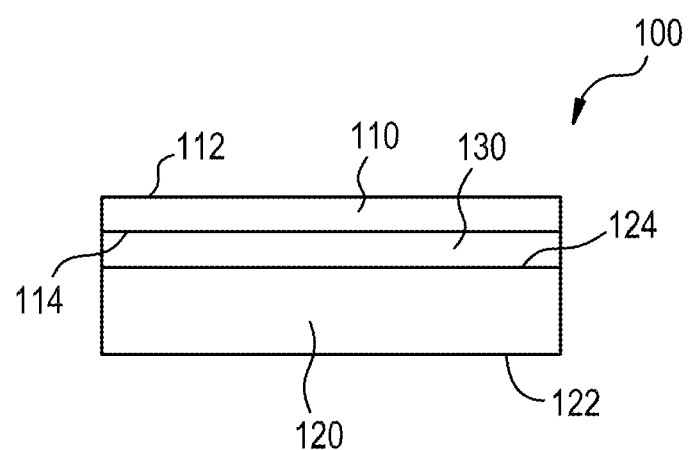
FIG. 1 is a schematic of an exemplary planar hybrid glass laminate according to some embodiments of the present disclosure.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

The following description of the present disclosure is provided as an enabling teaching thereof and its best, currently-known embodiment. Those skilled in the art will recognize that many changes can be made to the embodiment described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations of the present disclosure are possible and may even be desirable in certain circumstances and are part of the present disclosure. Thus, the following description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the following description of exemplary or illustrative embodiments is provided for the purpose of illustrating the principles of the present disclosure and not in limitation thereof and may include modification thereto and permutations thereof.

The glass laminate structures disclosed herein can be configured to include an external strengthened glass sheet and an internal non-strengthened glass sheet, an external non-strengthened glass sheet and an internal strengthened glass sheet, or external and internal strengthened glass sheets. As defined herein, when the glass laminate structures are put into use, an external glass sheet will be proximate to or in contact the environment or would face the exterior of the structure or vehicle incorporating the laminate, while an internal glass sheet will be proximate to or in contact with the interior (e.g., cabin) of the structure or vehicle (e.g., automotive) incorporating the glass laminate structure.

An exemplary glass laminate structure is illustrated in FIG. 1. The glass laminate structure 100 comprises an external glass sheet 110, an internal glass sheet 120, and a polymer interlayer 130. The polymer interlayer can be in direct physical contact with (e.g., laminated to) each of the respective external and internal glass sheets. In the depicted non-limiting embodiment, the polymer interlayer 130 is a non-wedge type interlayer. The external glass sheet 110 has an exterior surface 112 and an interior surface 114. In a similar vein, the internal glass sheet 120 has an exterior surface 122 and an interior surface 124. As shown in the illustrated embodiment, the interior surface 114 of external glass sheet 110 and the interior surface 124 of internal glass sheet 120 are each in contact with polymer interlayer 130.

Thus, as used herein, it is understood that an exterior surface of a glass sheet is the surface of the glass sheet opposite, or facing away from, the polymer interlayer, and the interior surface of a glass sheet is the surface of the glass sheet proximate to, or in contact with, the polymer interlayer. It is further understood that an interior surface of a glass laminate structure, e.g. a windshield, is the surface of the glass laminate structure that faces the interior (e.g., cabin) of the structure or vehicle (e.g., automotive) incorporating the glass laminate structure, and thus, the interior surface of the glass laminate structure is the exterior surface of the internal glass sheet. Likewise, the exterior surface of a glass laminate structure is the exterior surface of the external glass sheet, which is proximate to or in contact the environment.

During use, it is desirable that the glass laminate structure resists fracture in response to external impact events. In response to internal impact events, however, such as the glass laminates being struck by a vehicle's occupant, it is desirable that the glass laminate retain the occupant in the vehicle yet dissipate energy upon impact in order to minimize injury. The ECE R43 headform test, which simulates impact events occurring from inside a vehicle, is a regulatory test that requires that laminated glazings fracture in response to specified internal impact.

Without wishing to be bound by theory, when one pane of a glass sheet/polymer interlayer/glass sheet laminate is impacted, the opposite surface of the impacted sheet, as well as the exterior surface of the opposing sheet are placed into tension. Calculated stress distributions for a glass sheet/polymer interlayer/glass sheet laminate under biaxial loading reveal that the magnitude of tensile stress in the opposite surface of the impacted sheet may be comparable to (or even slightly greater than) the magnitude of the tensile stress experienced at the exterior surface of the opposing sheet for low loading rates. However, for high loading rates, which are characteristic of impacts typically experienced in automotives, the magnitude of the tensile stress at the exterior surface of the opposing sheet may be much greater than the tensile stress at the opposite surface of the impacted sheet. As disclosed herein, by configuring the hybrid glass laminate structures to have a strengthened external glass sheet and a non-strengthened internal glass sheet, the impact resistance for both external and internal impact events can be optimized.

Suitable internal or external glass sheets can be non-strengthened glass sheets or can also be strengthened glass sheets. The glass sheets (whether strengthened or non-strengthened) may include soda-lime glass, aluminosilicate, boroaluminosilicate or alkali aluminosilicate glass. Optionally, the internal glass sheets may be thermally strengthened. In embodiments where soda-lime glass is used as the non-strengthened glass sheet, conventional decorating materials and methods (e.g., glass frit enamels and screen printing) can be used, which can simplify the glass laminate structure manufacturing process. Tinted soda-lime glass sheets can be incorporated into a hybrid glass laminate structure to achieve desired transmission and/or attenuation across the electromagnetic spectrum.

Suitable external or internal glass sheets may be chemically-strengthened by an ion exchange process. In this process, typically by immersion of the glass sheet into a molten salt bath for a predetermined period of time, ions at or near the surface of the glass sheet are exchanged for larger metal ions from the salt bath. In one embodiment, the temperature of the molten salt bath is about 430° C. and the predetermined time period is about eight hours. The incorporation of the larger ions into the glass strengthens the sheet by creating a compressive stress in a near surface region. A corresponding tensile stress is induced within a central region of the glass to balance the compressive stress.

Exemplary ion-exchangeable glasses that are suitable for forming hybrid glass laminate structures are soda lime glasses, alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size. One exemplary glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further exemplary glass composition suitable for forming hybrid glass laminate structures comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further exemplary glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. % $\leq Li_2O+Na_2O+K_2O \leq 20$ mol. % and 0 mol. % $\leq MgO+CaO \leq 10$ mol. %.

In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

The chemically-strengthened as well as the non-chemically-strengthened glass, in some embodiments, can be batched with 0-2 mol. % of at least one fining agent selected from a group that includes $Na_2SO_4$, NaCl, NaF, NaBr, $K_2SO_4$, KCl, KF, KBr, and $SnO_2$.

In one exemplary embodiment, sodium ions in the chemically-strengthened glass can be replaced by potassium ions from the molten bath, though other alkali metal ions having a larger atomic radii, such as rubidium or cesium, can replace smaller alkali metal ions in the glass. According to particular embodiments, smaller alkali metal ions in the glass can be replaced by $Ag^+$ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of layer.

According to various embodiments, hybrid glass laminate structures comprising ion-exchanged glass can possess an array of desired properties, including low weight, high impact resistance, improved sound attenuation, and superior optical properties. In one embodiment, a chemically-strengthened glass sheet can have a surface compressive stress of at least 300 MPa, e.g., at least 400, 450, 500, 550, 600, 650, 700, 750 or 800 MPa, a depth of layer at least about 20 μm (e.g., at least about 20, 25, 30, 35, 40, 45, or 50 μm) and/or a central tension greater than 40 MPa (e.g., greater than 40, 45, or 50 MPa) but less than 100 MPa (e.g., less than 100, 95, 90, 85, 80, 75, 70, 65, 60, or 55 MPa).

A modulus of elasticity of a chemically-strengthened glass sheet can range from about 60 GPa to 85 GPa (e.g., 60, 65, 70, 75, 80 or 85 GPa). The modulus of elasticity of the glass sheet(s) and the polymer interlayer can affect both the mechanical properties (e.g., deflection and strength) and the acoustic performance (e.g., transmission loss) of the resulting glass laminate structure.

Suitable external or internal glass sheets may be thermally strengthened by a thermal tempering process or an annealing process. The thickness of the thermally-strengthened glass sheets may, in various embodiments, be less than about 2 mm or less than about 1 mm.

Exemplary glass sheet forming methods include fusion draw and slot draw processes, which are each examples of a down-draw process, as well as float processes. These methods can be used to form both strengthened and non-strengthened glass sheets. The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because only a single sheet is drawn through the slot, rather than two sheets being fused together.

Down-draw processes produce glass sheets having a uniform thickness that possess surfaces that are relatively pristine. Because the strength of the glass surface is controlled by the amount and size of surface flaws, a pristine surface that has had minimal contact has a higher initial strength. When this high strength glass is then chemically-strengthened, the resultant strength can be higher than that of a surface that has been a lapped and polished. Down-drawn glass may be drawn to a thickness of less than about 2 mm. In addition, down drawn glass has a very flat, smooth surface that can be used in its final application without costly grinding and polishing.

In the float glass method, a sheet of glass that may be characterized by smooth surfaces and uniform thickness is made by floating molten glass on a bed of molten metal, typically tin. In an exemplary process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress.

Glass sheets can be used to form glass laminate structures. As defined herein, a hybrid glass laminate structure in one embodiment can comprise an external strengthened glass sheet, an internal non-strengthened glass sheet, and a polymer interlayer disposed between the glass sheets. Another hybrid glass laminate structure can comprise an external non-strengthened glass sheet, an internal strengthened glass sheet, and a polymer interlayer disposed between the glass sheets. The polymer interlayer can comprise a monolithic polymer sheet, a wedge polymer sheet, a multilayer polymer sheet, or a composite polymer sheet. The polymer interlayer can be, for example, a plasticized poly(vinyl butyral) (PVB) sheet.

Glass laminate structures can be formed or assembled using a variety of processes. The assembly, in an exemplary embodiment, involves laying down a first sheet of glass, overlaying a polymer interlayer such as a PVB sheet, laying down a second sheet of glass, and then trimming the excess PVB to the edges of the glass sheets. A tacking step can include expelling most of the air from the interfaces and partially bonding the PVB to the glass sheets. The finishing step, typically carried out at elevated temperature and pressure, completes the mating of each of the glass sheets to the polymer interlayer. In the foregoing embodiment, the first sheet can be a chemically-strengthened glass sheet and the second sheet can be a non-chemically-strengthened glass sheet, or vice versa. While interlayers have been described heretofore as single layer and or substantially planar, the claims appended herewith should not be so limited. For example, the interlayer can be wedge-shaped and/or can be a multilayer material including a tinted layer on all or portions thereof, an IR or heat insulating layer(s), a sound insulating layer, etc. In one embodiment, an exemplary wedge-shaped interlayer can have a thickness of about 0.8 mm at a first edge of a laminate structure. At a second edge opposing the first edge of the laminate structure, the interlayer can have a thickness of about 1.0 mm. Of course, these thicknesses are exemplary only and should not limit the scope of the claims appended herewith.

A thermoplastic material such as PVB can be applied as a preformed polymer interlayer. The thermoplastic layer can, in certain embodiments, have a thickness of at least 0.125 mm (e.g., 0.125, 0.25, 0.38, 0.5, 0.7, 0.76, 0.81, 1, 1.14, 1.19 or 1.2 mm). The thermoplastic layer can have a thickness of less than or equal to 1.6 mm (e.g., from 0.4 to 1.2 mm, such as about 0.4, 0.5, 0.6, 0.7, 0.8, 0.9, 1.0, 1.1 or 1.2 mm). The thermoplastic layer can cover most or, preferably, substantially all of the two opposed major faces of the glass. It may also cover the edge faces of the glass. The glass sheets in contact with the thermoplastic layer may be heated above the softening point of the thermoplastic, such as, for example, at least 5° C. or 10° C. above the softening point, to promote bonding of the thermoplastic material to the respective glass sheets. The heating can be performed with the glass in contact with the thermoplastic layers under pressure.

Select commercially available polymer interlayer materials are summarized in Table 1, which provides also the glass transition temperature and modulus for each product sample. Glass transition temperature and modulus data were determined from technical data sheets available from the vendor or using a DSC 200 Differential Scanning Calorimeter (Seiko Instruments Corp., Japan) or by ASTM D638 method for the glass transition and modulus data, respectively. A further description of the acrylic/silicone resin materials used in the ISD resin is disclosed in U.S. Pat. No. 5,624,763, and a description of the acoustic modified PVB resin is disclosed in Japanese Patent No. 05138840, the entire contents of each are hereby incorporated by reference in their entirety.

TABLE 1

Exemplary Polymer Interlayer Materials

| Interlayer Material | $T_g$ (° C.) | Modulus, psi (MPa) |
|---|---|---|
| EVA (STR Corp., Enfield, CT) | −20 | 750-900 (5.2-6.2) |
| EMA (Exxon Chemical Co., Baytown, TX) | −55 | <4,500 (27.6) |
| EMAC (Chevron Corp., Orange, TX) | −57 | <5,000 (34.5) |
| PVC plasticized (Geon Company, Avon Lake, OH) | −45 | <1500 (10.3) |
| PVB plasticized (Solutia, St. Louis, MO) | 0 | <5000 (34.5) |
| Polyethylene, Metallocene-catalyzed (Exxon Chemical Co., Baytown, TX) | −60 | <11,000 (75.9) |
| Polyurethane Hard (97 Shore A) | 31 | 400 |
| Polyurethane Semi-rigid (78 Shore A) | −49 | 54 |
| ISD resin (3M Corp., Minneapolis, MN) | −20 | |
| Acoustic modified PVB (Sekisui KKK, Osaka, Japan) | | 140 |
| Uvekol A (liquid curable resins) (Cytec, Woodland Park, NJ) | | |

One or more polymer interlayers can be incorporated into a hybrid glass laminate structure. A plurality of interlayers may provide complimentary or distinct functionality, including adhesion promotion, acoustic control, UV transmission control, tinting, coloration and/or IR transmission control.

A modulus of elasticity of the polymer interlayer can range from about 1 MPa to 75 MPa (e.g., about 1, 2, 5, 10, 15, 20, 25, 50 or 75 MPa). At a loading rate of 1 Hz, a modulus of elasticity of a standard PVB interlayer can be about 15 MPa, and a modulus of elasticity of an acoustic grade PVB interlayer can be about 2 MPa.

During the lamination process, the interlayer is typically heated to a temperature effective to soften the interlayer, which promotes a conformal mating of the interlayer to respective surfaces of the glass sheets. For PVB, a lamination temperature can be about 140° C. Mobile polymer chains within the interlayer material develop bonds with the glass surfaces, which promote adhesion. Elevated temperatures also accelerate the diffusion of residual air and/or moisture from the glass-polymer interface.

The application of pressure both promotes flow of the interlayer material, and suppresses bubble formation that otherwise could be induced by the combined vapor pressure of water and air trapped at the interfaces. To suppress bubble formation, heat and pressure are simultaneously applied to the assembly in an autoclave.

Hybrid glass laminate structures can provide beneficial effects, including the attenuation of acoustic noise, reduction of UV and/or IR light transmission, and/or enhancement of the aesthetic appeal of a window opening. The individual glass sheets comprising the disclosed glass laminate structures, as well as the laminates, can be characterized by one or more attributes, including composition, density, thickness, surface metrology, as well as various properties including optical, sound-attenuation, and mechanical properties such as impact resistance. Various aspects of the disclosed hybrid glass laminate structures are described herein.

Exemplary hybrid glass laminate structures can be adapted for use, for example, as windows or glazings, and configured to any suitable size and dimension. In some embodiments, the glass laminate structures can have a length and width that independently vary from 10 cm to 1 m or more (e.g., 0.1, 0.2, 0.5, 1, 2, or 5 m). Independently, the glass laminates can have an area of greater than 0.1 m², e.g., greater than 0.1, 0.2, 0.5, 1, 2, 5, 10, or 25 m².

Exemplary hybrid glass laminate structures can be substantially flat or shaped for certain applications. For instance, the glass laminate structures can be formed as bent or shaped parts for use as windshields or cover plates. The structure of a shaped glass laminate may be simple or complex. In certain embodiments, a shaped glass laminate structure may have a complex curvature where the glass sheets have a distinct radius of curvature in two independent directions. Such shaped glass sheets may thus be characterized as having "cross curvature," where the glass is curved along an axis that is parallel to a given dimension and also curved along an axis that is perpendicular to the same dimension. An automotive sunroof, for example, typically measures about 0.5 m by 1.0 m and has a radius of curvature of 2 to 2.5 m along the minor axis, and a radius of curvature of 4 to 5 m along the major axis.

Shaped glass laminate structures according to certain embodiments can be defined by a bend factor, where the bend factor for a given part is equal to the radius of curvature along a given axis divided by the length of that axis. Thus, for the exemplary automotive sunroof having radii of curvature of 2 m and 4 m along respective axes of 0.5 m and 1.0 m, the bend factor along each axis is 4. Shaped glass laminate structures can have a bend factor ranging from 2 to 8 (e.g., 2, 3, 4, 5, 6, 7, or 8).

Figure 2:
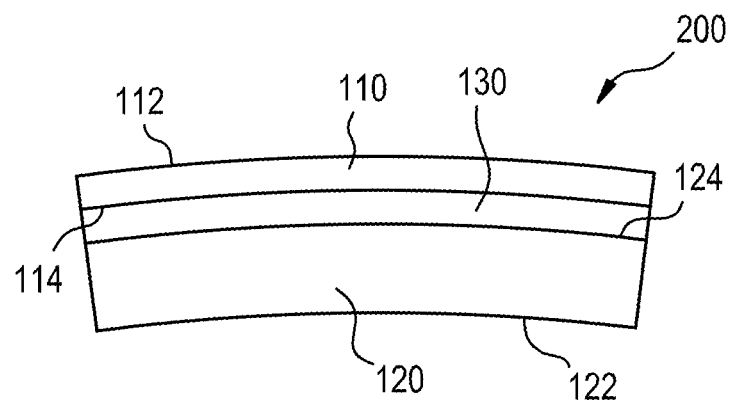
FIG. 2 is a schematic of an exemplary bent hybrid glass laminate according to other embodiments of the present disclosure.

An exemplary shaped glass laminate structure 200 is illustrated in FIG. 2. The shaped glass laminate structure 200 comprises an external (strengthened) glass sheet 110 disposed at a convex surface of the laminate while an internal (non-strengthened) glass sheet 120 is disposed on a concave surface of the laminate. It will be appreciated, however, that the convex surface of a non-illustrated embodiment can comprise a non-strengthened glass sheet while an opposing concave surface can comprise a strengthened glass sheet. It can also be appreciated that both the convex and concave surface of a non-illustrated embodiment can comprise chemically-strengthened glass sheets.

Figure 3:
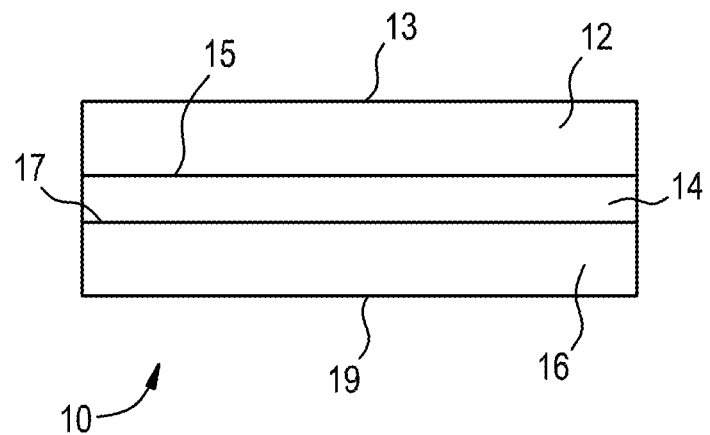
FIG. 3 is a schematic of an exemplary bent hybrid glass laminate according to further embodiments of the present disclosure.
Figure 4:
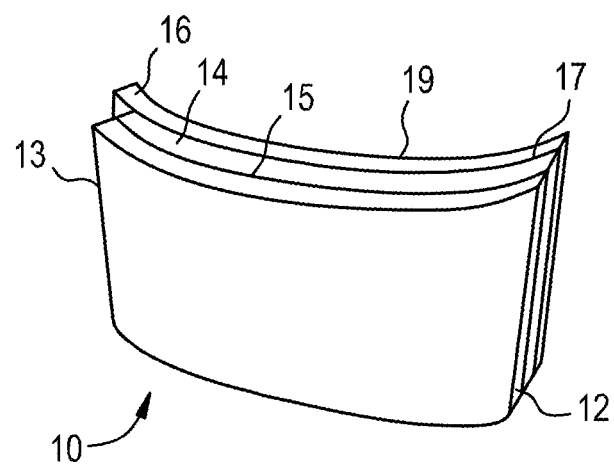
FIG. 4 is a schematic of an exemplary bent hybrid glass laminate according to additional embodiments of the present disclosure.

FIG. 3 is a cross sectional illustration of further embodiments of the present disclosure. FIG. 4 is a perspective view of additional embodiments of the present disclosure. With reference to FIGS. 3 and 4 and as discussed in previous paragraphs, an exemplary laminate structure 10 can include an internal layer (sheet) 16 of strengthened glass (e.g., chemically strengthened glass, thermally strengthened glass or glass that is both chemically and thermally strengthened). This internal layer 16 may have been heat treated, ion exchanged and/or annealed. The external layer (sheet) 12 may be a non-strengthened glass sheet such as conventional soda lime glass, annealed glass, or the like. In one or more embodiments, the interlay layer (sheet) 16 may comprise chemically strengthened glass and the external layer (sheet) 12 may comprise thermally strengthened glass. The laminate structure 10 can also include a polymeric interlayer 14 intermediate the external and internal glass layers. The internal layer of glass 16 can have a thickness of less than or equal to 1.0 mm and having a residual surface CS level of between about 250 MPa to about 350 MPa with a DOL of greater than 60 microns. In another embodiment the CS level of the internal layer 16 is preferably about 300 MPa. In one embodiment, an interlayer 14 can have a thickness of approximately 0.8 mm. Exemplary interlayers 14 can include, but are not limited to, poly-vinyl-butyral or other suitable polymeric materials as described herein. Further interlayers 14 can include wedge-shaped interlayers (e.g., single layer, multilayer structure including a tinted layer on all or portions thereof, an IR or heat insulating layer(s), a sound insulating layer, etc.). In additional embodiments, any of the surfaces of the external and/or internal layers 12, 16 can be acid etched to improve durability to external impact events. For example, in one embodiment, a first exterior surface 13 of the external layer 12 can be acid etched and/or another interior surface 17 of the internal layer can be acid etched. In another embodiment, a first interior surface 15 of the external layer can be acid etched and/or another exterior surface 19 of the internal layer can be acid etched. Such embodiments can thus provide a laminate construction substantially lighter than conventional laminate structures and which conforms to regulatory impact requirements. Exemplary thicknesses of the external and/or internal layers 12, 16 can range in thicknesses from about 0.3 mm to about 1.5 mm, such as from about 0.5 mm to about 1.5 mm or about 2.0 mm or more.

In a preferred embodiment, the thin, chemically-strengthened internal layer 16 may have a surface stress between about 250 MPa and 900 MPa and can range in thickness from about 0.3 mm to about 1.0 mm. In this embodiment, the external layer 12 can be annealed (non-chemically-strengthened) glass with a thickness from about 1.5 mm to about 3.0 mm or more. Of course, the thicknesses of the external and internal layers 12, 16 can be different in a respective laminate structure 10. Another preferred embodiment of an exemplary laminate structure may include an internal layer of 0.7 mm chemically-strengthened glass, a poly-vinyl butyral layer of about 0.76 mm in thickness and a 2.1 mm exterior layer of annealed glass.

In some embodiments, exemplary hybrid glass laminate structures can be employed in vehicles (automotive, aircraft, and the like) having a Head-up or Heads-up Display (HUD) system. The clarity of fusion formed according to some embodiments can be superior to conventional glass laminate structures, to thereby provide a better driving experience as well as improve safety since information can be easier to read and less of a distraction. A non-limiting HUD system can include a projector unit, a combiner, and a video generation computer. The projection unit in an exemplary HUD can be, but is not limited to, an optical collimator having a convex lens or concave mirror with a display (e.g., optical waveguide, scanning lasers, LED, CRT, video imagery, or the like) at its focus. The projection unit can be employed to produce a desired image. In some embodiments, the HUD system can also include a combiner or beam splitter to redirect the projected image from the projection unit to vary or alter the field of view and the projected image. Some combiners can include special coatings to reflect monochromatic light projected thereon while allowing other wavelengths of light to pass through. In additional embodiments, the combiner can also be curved to refocus an image from the projection unit. Any exemplary HUD system can also include a processing system to provide an interface between the projection unit and applicable vehicle systems from which data can be received, manipulated, monitored and/or displayed. Some processing systems can also be utilized to generate the imagery and symbology to be displayed by the projection unit.

Using such an exemplary HUD system, a display of information (e.g., numbers, images, directions, wording, or otherwise) can be created by projecting an image from the HUD system onto an interior surface 19 of an exemplary glass laminate structure 10. The glass laminate structure 10 can then redirect the image so that it is in the field of view of a driver. In some embodiments, the interlayer 14 can include additional films which reflect a particular wavelength of light (beamsplitter) of the projector. Additional interlayers (e.g., a polarizing film or the like) can be employed in some embodiments and may be dependent upon the design of the respective HUD system and its light source.

Figure 5A:
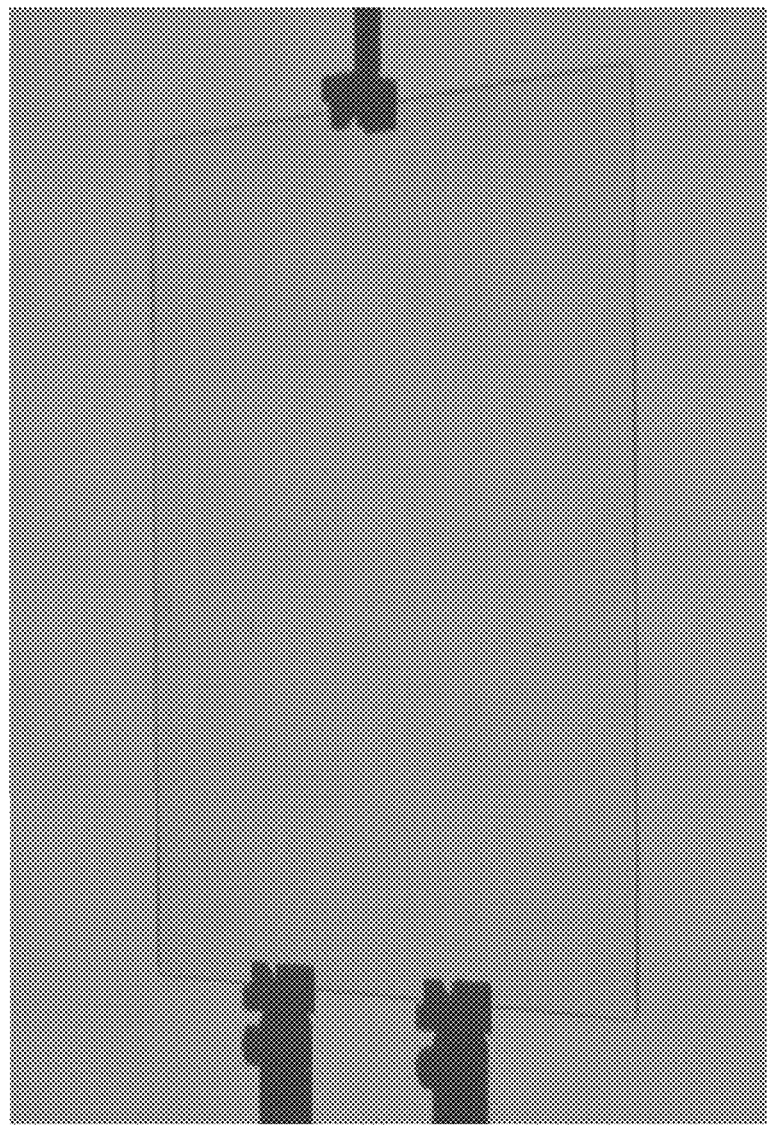
FIG. 5A is a photograph of a 1.6 mm thick soda lime glass sheet taken at a 45° angle of incidence.
Figure 5B:
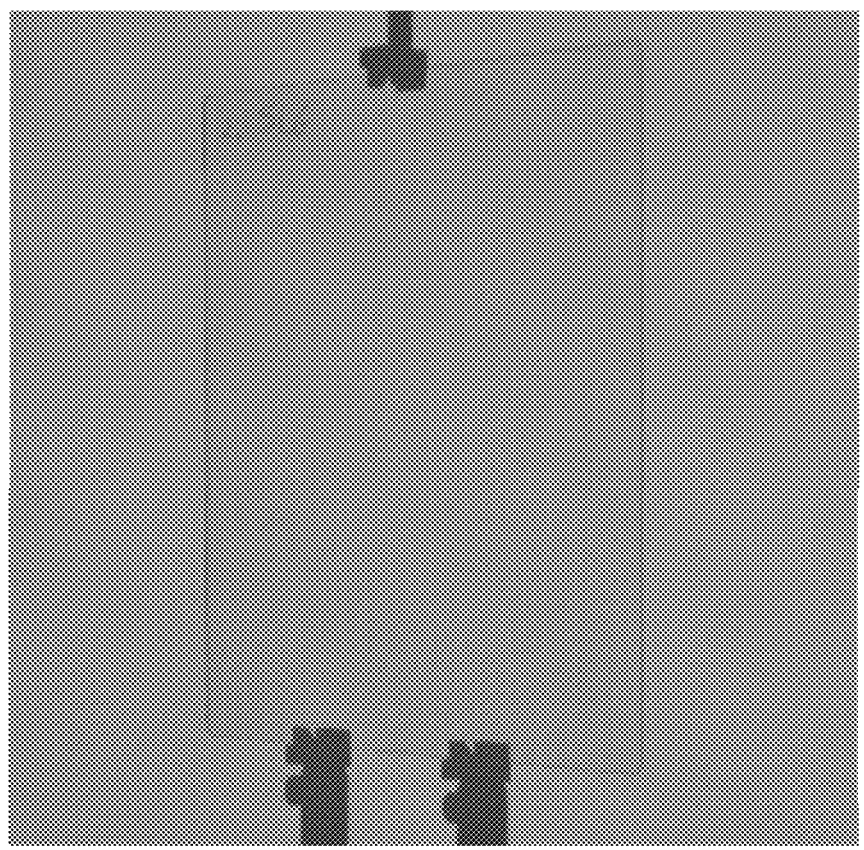
FIG. 5B is a photograph of a 2.1 mm thick soda lime glass sheet taken at a 45° angle of incidence.
Figure 5C:
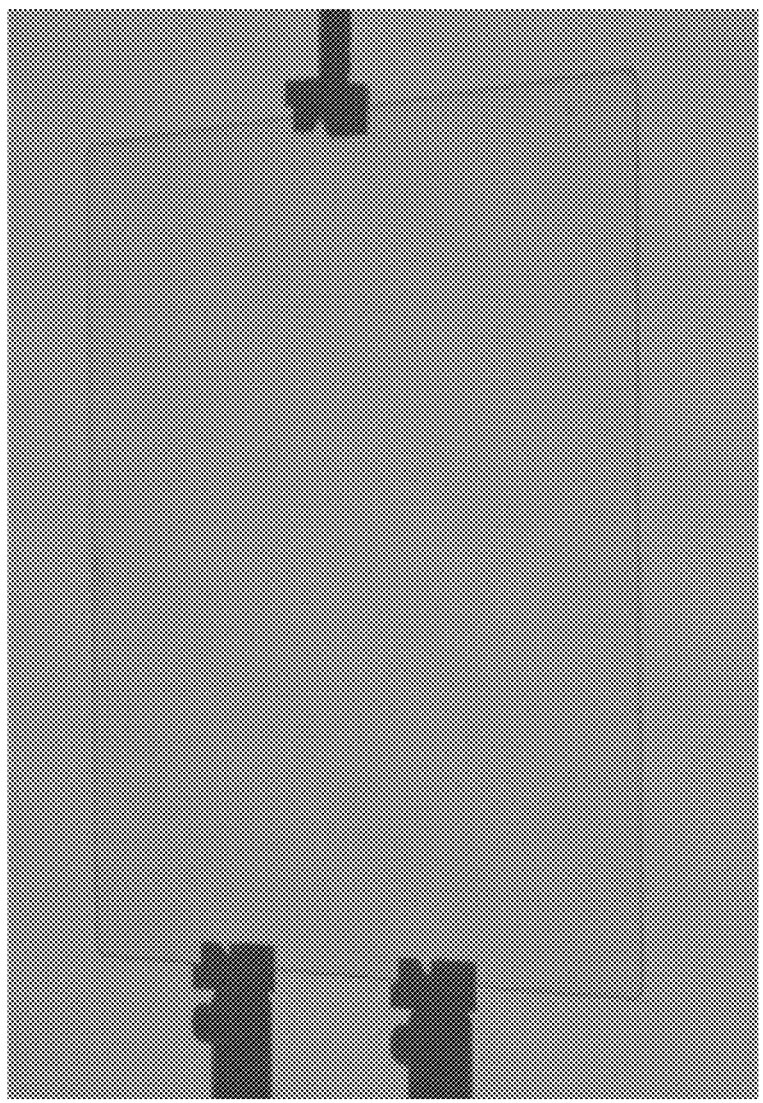
FIG. 5C is a photograph of a 0.7 mm thick sheet of Gorilla® Glass taken at a 45° angle of incidence.

Exemplary glass laminate structures according to some embodiments can thus provide a thin, pristine exterior surface 19 for the internal sheet 16 of glass. In some embodiments, fusion drawn Gorilla® Glass can be used as the strengthened internal glass sheet. Such glass does not contain any float lines typical of conventional glass manufactured with the float process (e.g., soda lime glass). FIG. 5A is a photograph of a 1.6 mm thick soda lime glass sheet taken at a 45° angle of incidence. FIG. 5B is a photograph of a 2.1 mm thick soda lime glass sheet taken at a 45° angle of incidence. FIG. 5C is a photograph of a 0.7 mm thick sheet of Gorilla® Glass taken at a 45° angle of incidence. As evidenced by FIGS. 5A, 5B and 5C, the Gorilla® Glass sheet does not suffer from the draw line appearance that can cause ghost images as with the soda-lime glass sheets in FIGS. 5A and 5B.

Figure 6A:
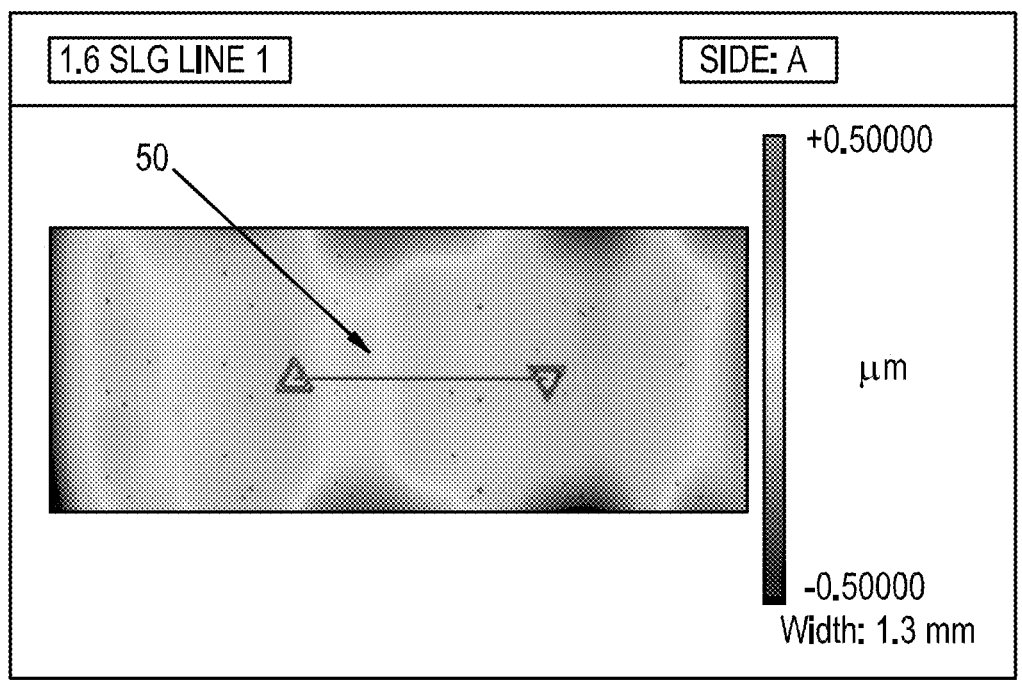
FIGS. 6A and 6B are contour and surface profile measurements of a 1.6 mm thick soda lime glass sheet.
Figure 6B:
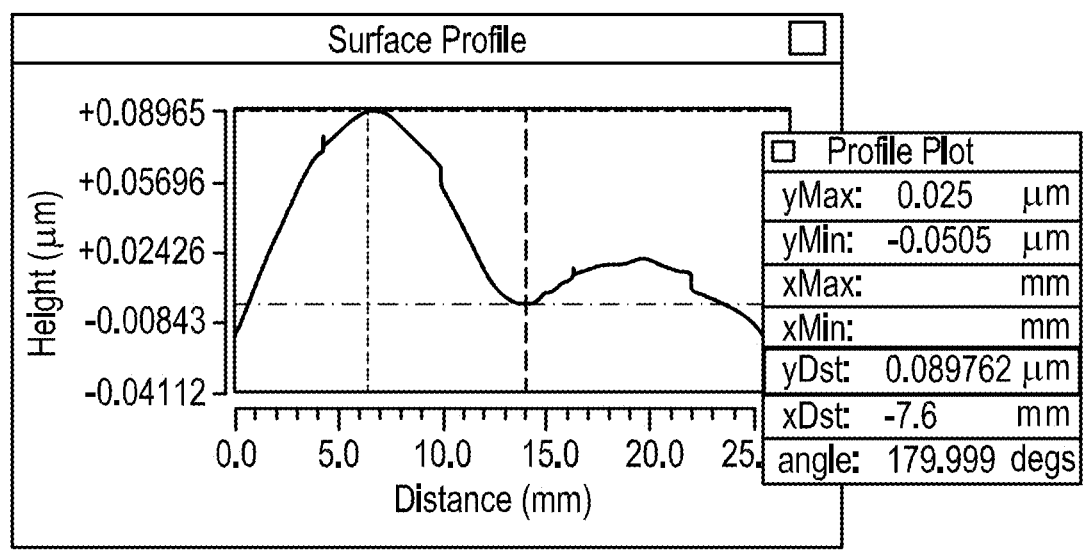
Figure 7A:
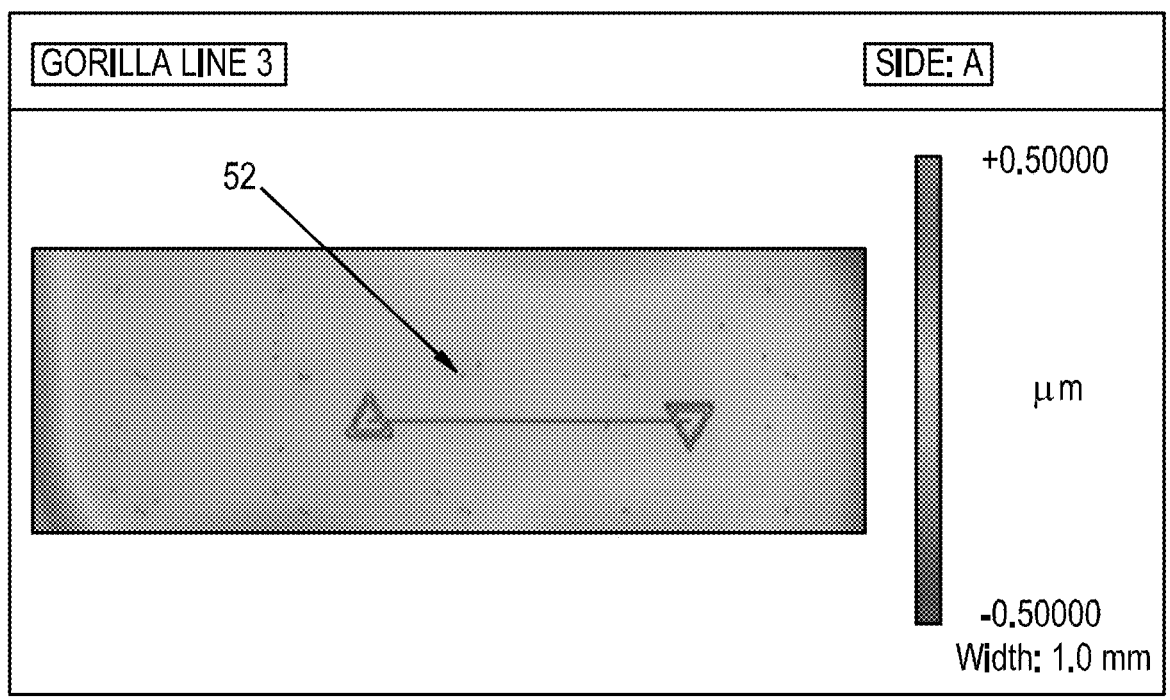
FIGS. 7A and 7B are contour and surface profile measurements of a 0.7 mm thick sheet of Gorilla® Glass.
Figure 7B:
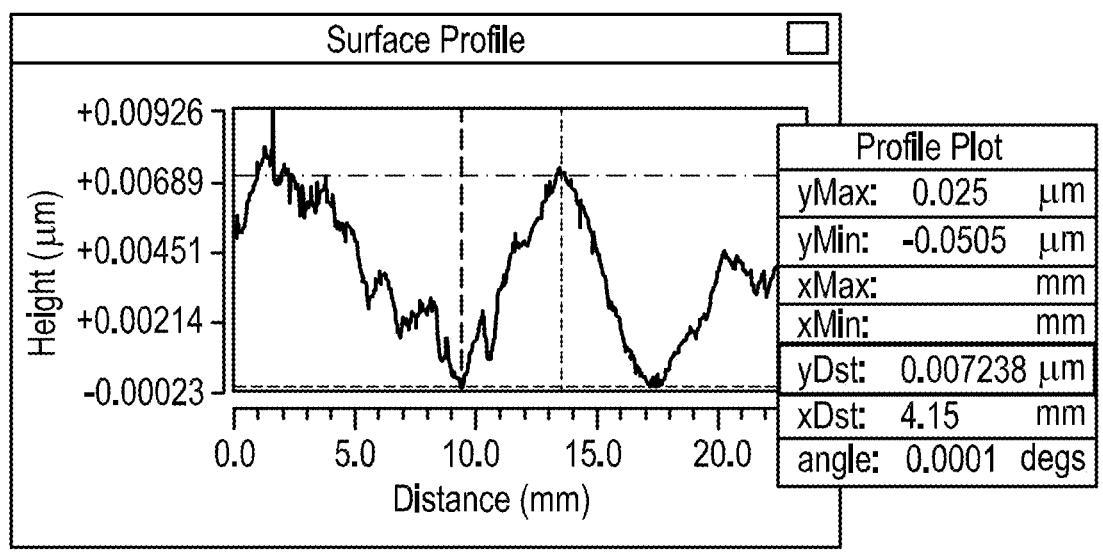

Surface measurements conducted by Applicant indicate that there exists an order of magnitude increase in peak to valley surface roughness between Gorilla® Glass and soda lime glass sheets as measured by a Zygo NewView interferometer. FIGS. 6A and 6B are contour and surface profile measurements of a 1.6 mm thick soda lime glass sheet along a line 50. FIGS. 7A and 7B are contour and surface profile measurements along a line 52 of a 0.7 mm thick sheet of Gorilla® Glass. As shown in these figures, the surface perturbations of soda lime glass formed by the float process varied greatly and were discovered by Applicant to contribute to ghost images seen in HUD displays. Specifically, the soda lime glass of FIGS. 6A and 6B exhibited a maximum surface perturbation (which is the distance between an absolute maximum peak to an absolute maximum valley) of 0.089762 µm, as measured along line 50 having a length of 10 mm. In comparison, a Gorilla® Glass sheet was found to have minimal perturbations as shown in FIGS. 7A and 7B. Specifically, as shown in FIGS. 7A and 7B, the maximum surface perturbation was 0.007238 µm, as measured along line 52 having a length of 10 mm. Accordingly, in one or more embodiments, the strengthened layer of the laminates described herein may comprise a maximum surface perturbation of less than about 0.05 µm (e.g., 0.04 µm or less, 0.03

µm or less, 0.02 µm or less, 0.01 µm or less, 0.009 µm or less, or 0.008 µm or less), as measured along a linear distance of 10 mm.

Figure 8A:
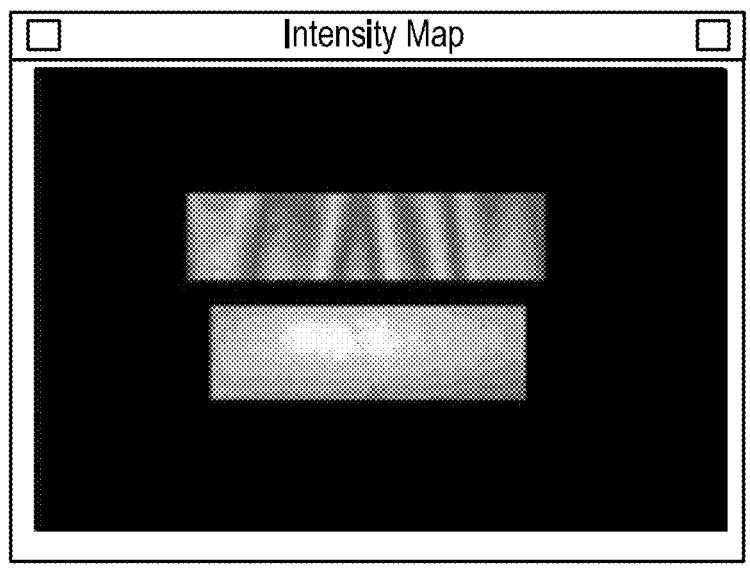
FIGS. 8A and 8B are Zygo intensity maps for a 1.6 mm thick soda lime glass sheet.
Figure 8B:
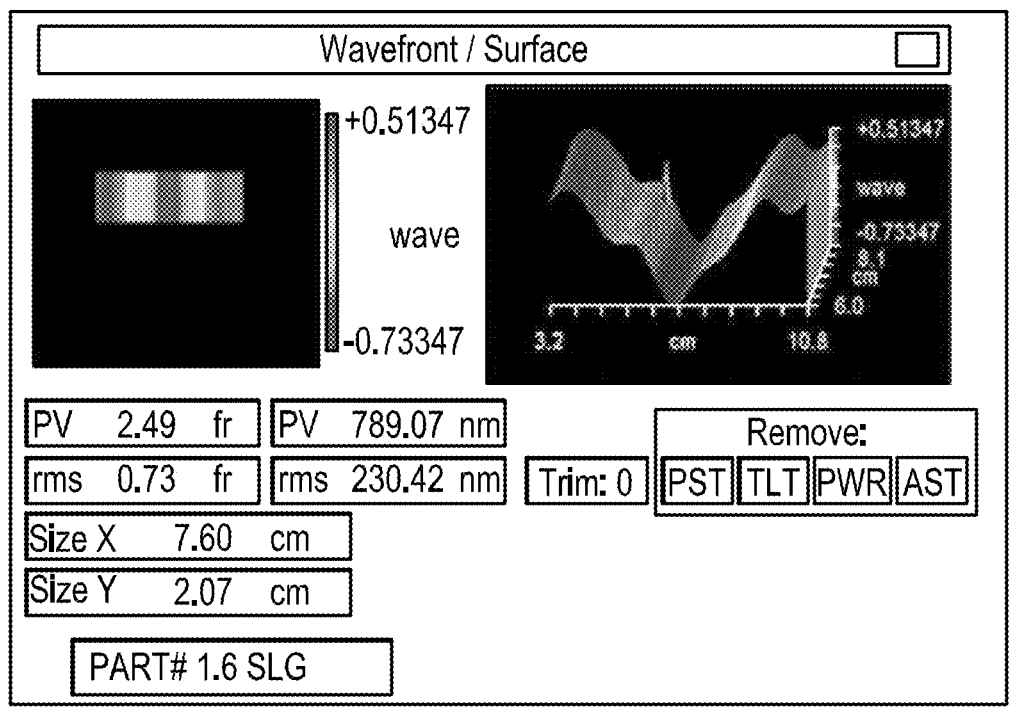
Figure 9A:
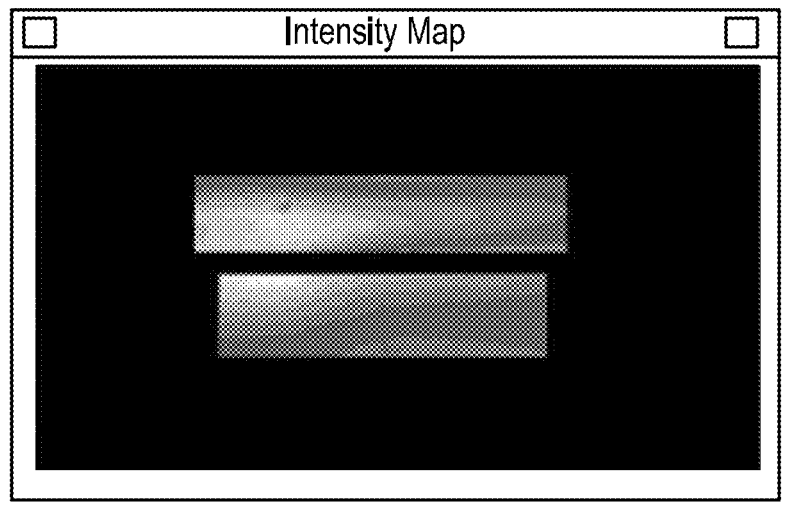
FIGS. 9A and 9B are Zygo intensity maps for a 0.7 mm thick Gorilla® Glass sheet.
Figure 9B:
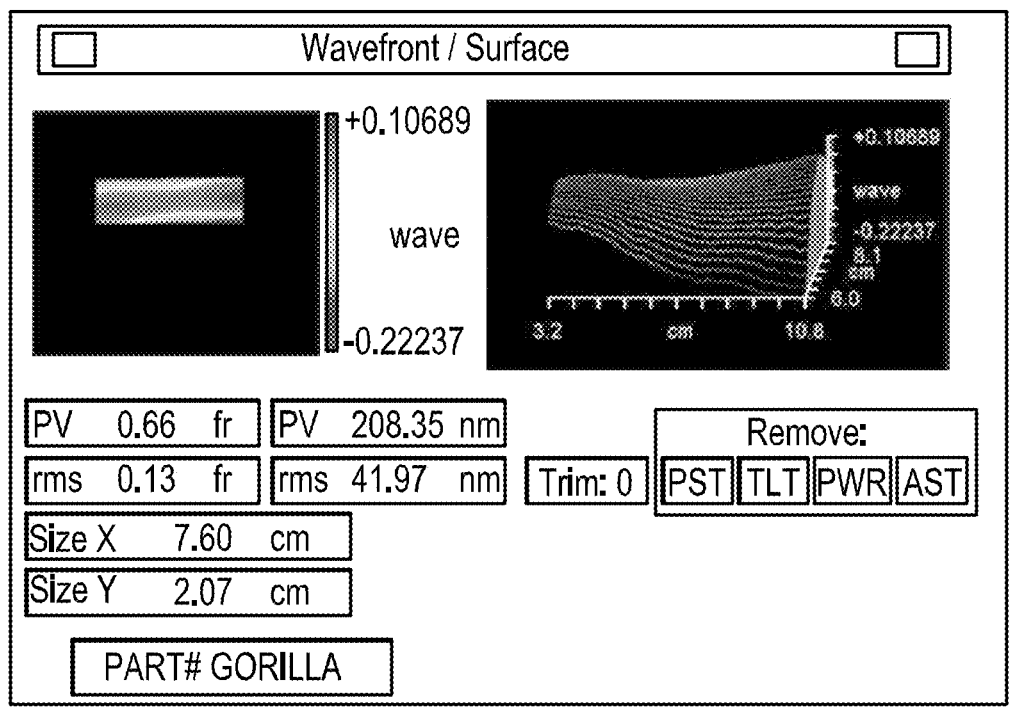

1.6 mm thick soda lime glass and 0.7 mm thick Gorilla® Glass samples were measured using a Zygo GPI interferometer to determine impact of draw lines on a transmitted wavefront on the glass sheet. With no bulk non-uniformities (e.g., no draw lines), an exiting or reflected wavefront remained substantially unchanged; however, when bulk non-uniformities existed (soda lime glass), the exiting or reflected wavefront became distorted. FIGS. 8A and 8B are Zygo intensity maps for a 1.6 mm thick soda lime glass sheet and FIGS. 9A and 9B are Zygo intensity maps for a 0.7 mm thick Gorilla® Glass sheet. With reference to FIGS. 8A and 8B, a much higher and dramatic periodic variation in the fringe pattern of the soda lime glass sheet was observed which illustrated a greater wavefront distortion (and hence ghost image effect) in comparison to wavefronts propagating through the Gorilla® Glass sheet (FIGS. 9A and 9B).

HUD systems according to embodiments of the present disclosure can be employed in automotive vehicles, aircraft, synthetic vision systems, and/or mask displays (e.g., head mounted displays such as goggles, masks, helmets, and the like) utilizing exemplary glass laminate structures described herein. Such HUD systems can project critical information (speed, fuel, temperature, turn signal, warning messages, etc.) in front of the driver through the glass laminate structure. In various embodiments, a HUD system can be employed with glass laminate structures having planar or wedge-shaped polymer interlayers. It should be noted, however, that in addition to the composition and type of glass sheet as described above, the geometry of the glass laminate structure can also have an effect upon the quality of images provided to a user or driver.

Figure 10:
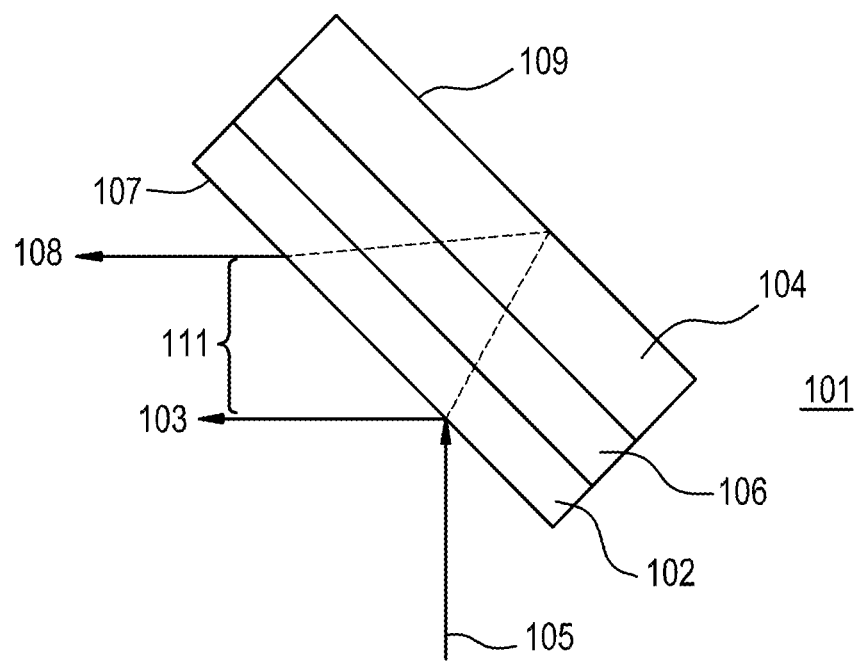
FIG. 10 is a pictorial depiction of a standard windshield using a HUD system.

FIGS. 10 and 11A-11C are pictorial depictions of a conventional laminate windshield (FIG. 10) using a HUD system, and a glass laminate windshield according to embodiments of the disclosure (FIGS. 11A-11C) using a HUD system. With reference to FIG. 10, a standard windshield 101 is illustrated having a planar shaped polymer interlayer 106 intermediate first internal and second external soda lime glass sheets 102, 104. An image (speed, fuel, temperature, turn signal, warning messages, etc.) 105 can be projected from a HUD system or projector onto the standard windshield 101 resulting in the generation of a first image 103 from an exterior surface 107 of the internal soda lime glass sheet 102 and a second image 108 from the transmission of the image 105 through the windshield and reflecting from the exterior surface 109 of the external soda lime glass sheet 104. The large travel distance of this second image 108 through the windshield results in a larger gap 111 between the first and second images 103, 108. This gap 111 is typically called a "ghost image" and results in a blurred compound or double image provided to a viewer.

Figure 11A:
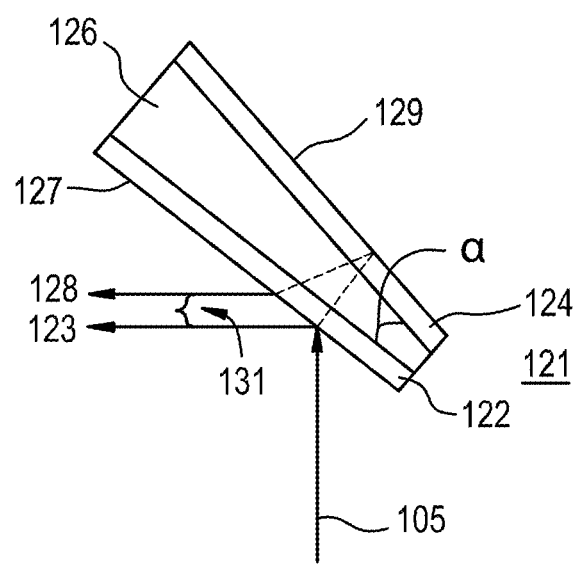
FIGS. 11A, 11B and 11C are pictorial depictions of some embodiments using a HUD system.

With reference to FIG. 11A, some exemplary glass laminate structures 121 according to embodiments of the present disclosure can include a wedge-shaped polymer interlayer 126 (having a wedge angle α) intermediate first internal and second external chemically-strengthened glass sheets 122, 124 (e.g., Gorilla® Glass). An image (speed, fuel, temperature, turn signal, warning messages, etc.) 105 can be projected from a HUD system or projector onto the structure 121 resulting in the generation of a first image 123 from an exterior surface 127 (a first reflective surface) of the first chemically-strengthened glass sheet 122 and a second image 128 from the transmission of the image 105 through the structure and reflecting from the exterior surface 129 (a second reflective surface) of the second chemically-strengthened glass sheet 124. The short travel distance of this second image 128 through the structure 121 results in a small (if any) gap 131 between the first and second images 123, 128 and resulting in a high quality compound image provided to a viewer.

Figure 11B:
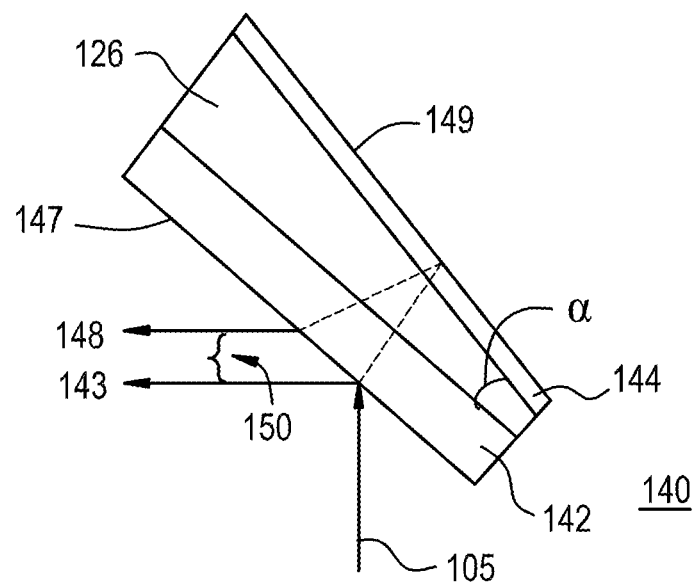

Similarly and with reference to FIG. 11B, other exemplary glass laminate structures 140 can include a wedge-shaped polymer interlayer 126 (having a wedge angle α) intermediate an internal non-chemically-strengthened glass sheet 142 and an external chemically-strengthened glass sheet 144. An image (speed, fuel, temperature, turn signal, warning messages, etc.) 105 can be projected from a HUD system or projector onto the structure 140 resulting in the generation of a first image 143 from an exterior surface 147 (a first reflective surface) of the internal non-chemically-strengthened glass sheet 142 and a second image 148 from the transmission of the image 105 through the structure and reflecting from the exterior surface 149 (a second reflective surface) of the external chemically-strengthened glass sheet 144. The short travel distance of this second image 148 through the structure 140 results in a small (if any) gap 150 between the first and second images 143, 148 and resulting in a high quality compound image provided to a viewer.

Figure 11C:
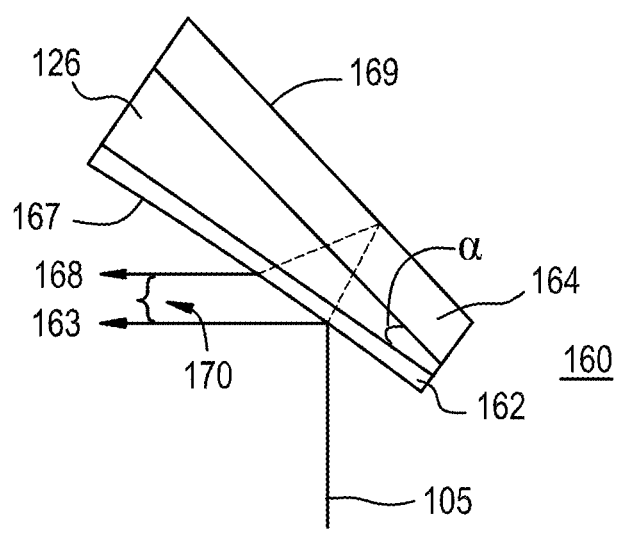

With reference to FIG. 11C, additional exemplary glass laminate structures 160 can include a wedge-shaped polymer interlayer 126 (having a wedge angle α) intermediate an internal chemically-strengthened glass sheet 162 and an external non-chemically-strengthened glass sheet 164. An image (speed, fuel, temperature, turn signal, warning messages, etc.) 105 can be projected from a HUD system or projector onto the structure 160 resulting in the generation of a first image 163 from an exterior surface 167 (a first reflective surface) of the internal chemically-strengthened glass sheet 162 and a second image 168 from the transmission of the image 105 through the structure and reflecting from the exterior surface 169 (a second reflective surface) of the external non-chemically-strengthened glass sheet 164. The short travel distance of this second image 168 through the structure 160 results in a small (if any) gap 170 between the first and second images 163, 168 and resulting in a high quality compound image provided to a viewer.

It should be noted that HUD systems are sensitive to the angle of the reflecting medium (e.g., windshield position). Thus, the gap exhibited by a standard windshield with a more acute angle to the horizontal will be significantly noticeable in comparison to gaps (if any) of exemplary structures according to embodiments of the present disclosure. Embodiments described herein can thus improve yield by more relaxed specification in windshield manufacturing and can allow a wider viewable angle.

While wedge-shaped interlayers have been described as a single layer, the claims appended herewith should not be so limited. For example, the wedge-shaped interlayer can be a multilayer material including a tinted layer on all or portions thereof, an IR or heat insulating layer(s), a sound insulating layer, etc. In one embodiment, an exemplary wedge-shaped interlayer can have a thickness of about 0.8 mm at a first edge of a laminate structure. At a second edge opposing the first edge of the laminate structure, the interlayer can have a thickness of about 1.0 mm. Of course, these thicknesses are exemplary only and should not limit the scope of the claims appended herewith.

Figure 12:
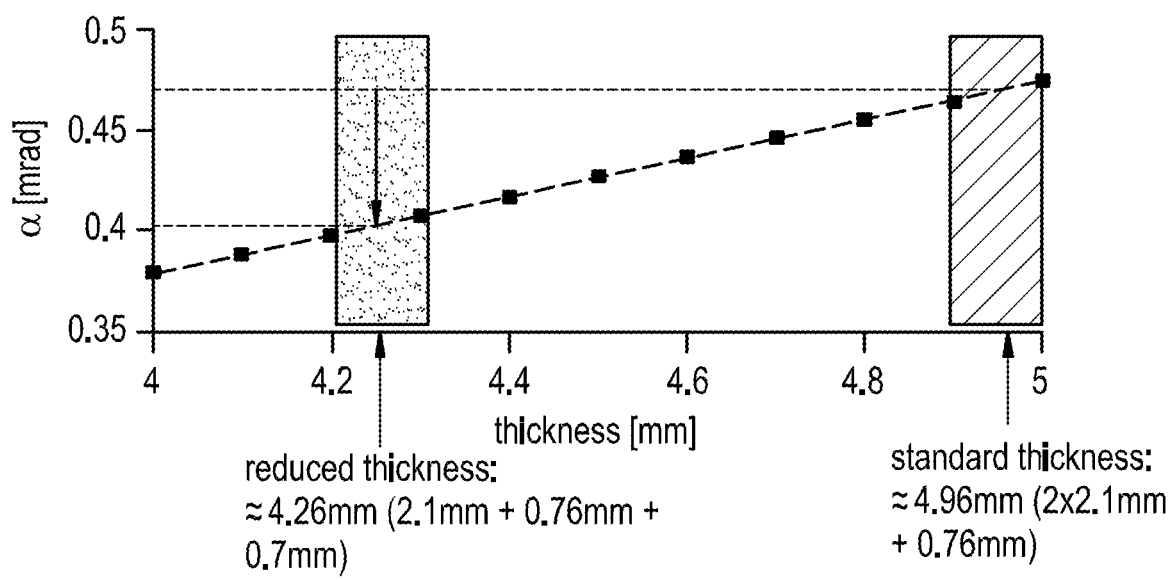
FIG. 12 is a plot of wedge angle versus laminate structure thickness for some embodiments.

FIG. 12 is a plot of wedge angle versus laminate structure thickness for some embodiments. With reference to FIG. 12, it was discovered that wedge angle α possesses a linear dependence on the glass laminate structure, e.g., windshield, etc., thickness using nominal HUD system parameters (e.g., radius of curvature $R_c$=8301 mm, distance to source: $R_i$=1000 mm, refractive index n=1.52, and angle of incidence θ=62.08°). As shown in FIG. 12, it was found that the wedge angle α required to eliminate the double image decreases linearly with the windshield thickness. That is, for nominal windshield parameters the wedge angle is reduced from approximately 0.475 mrad to approximately 0.4 mrad, when the thickness is reduced by 0.7 mm.

Figure 13:
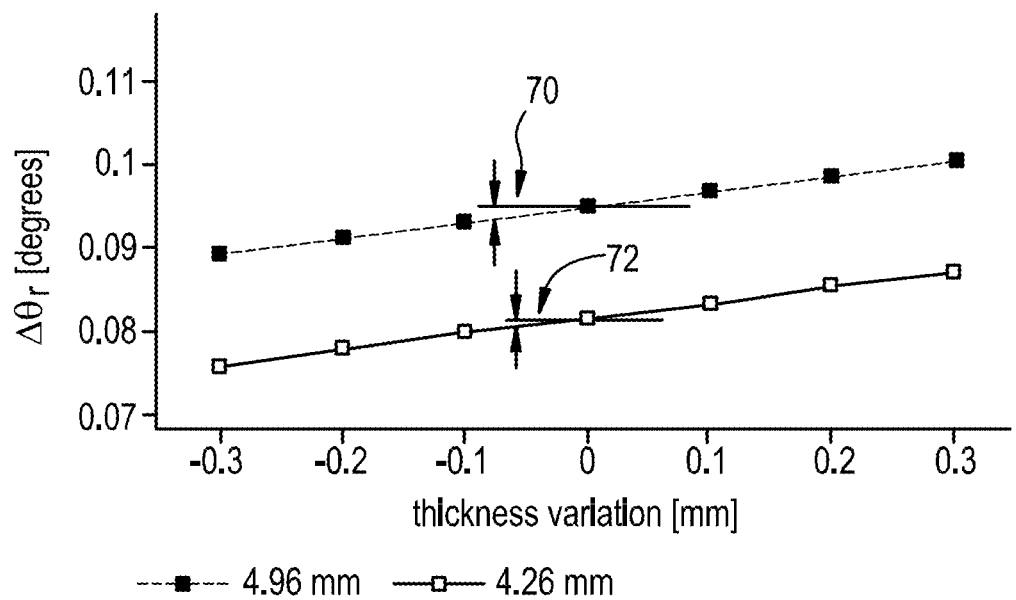
FIG. 13 is a plot of double image angle $\Delta\theta_r$ dependence on the windshield thickness variation using nominal HUD system parameters.
Figure 15:
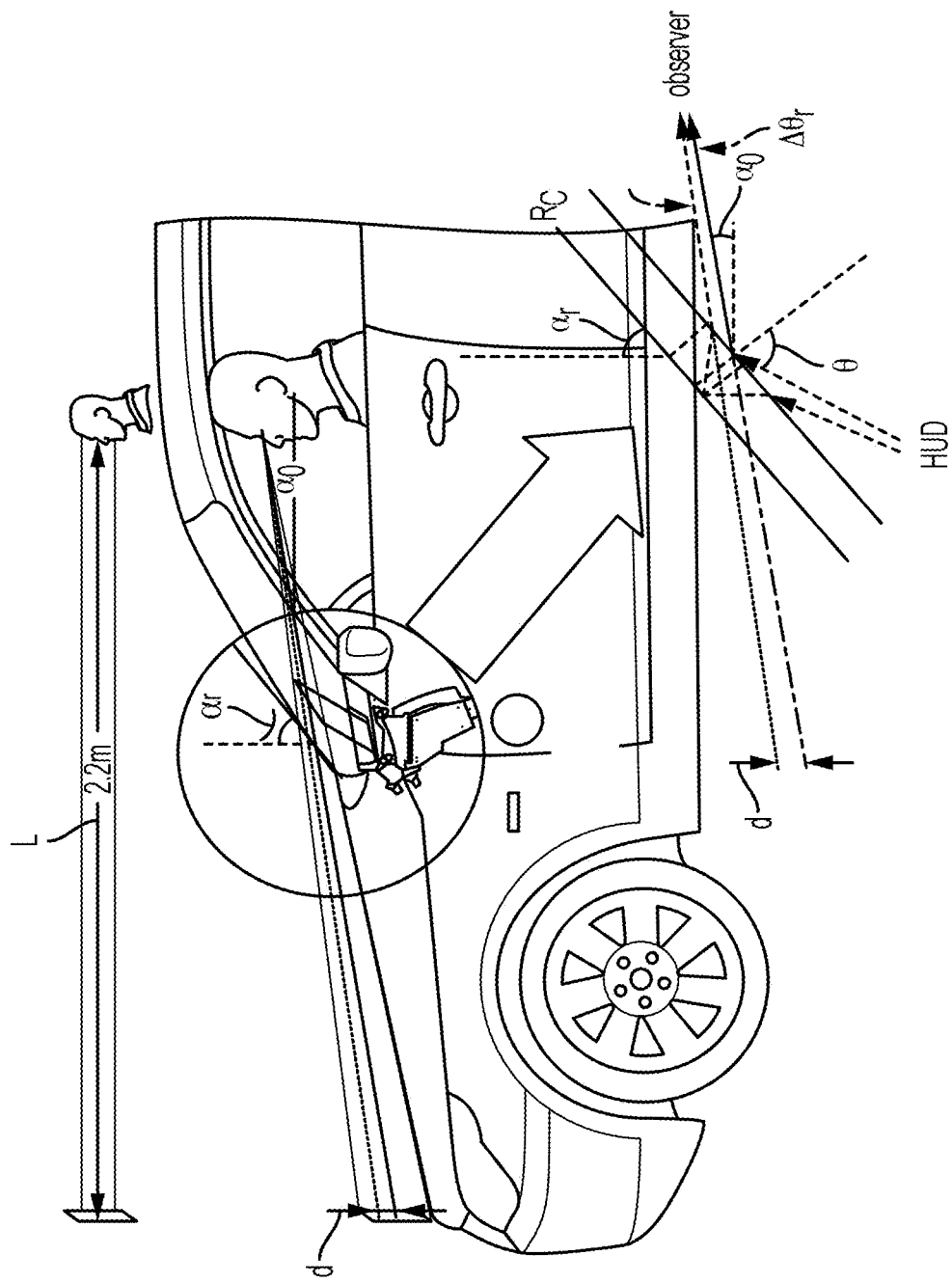
FIG. 15 is a diagram illustrating the mechanism for generation of a double image on a transparent display screen.

FIG. 13 is a plot of double image angle $\Delta\theta_r$ dependence on the windshield thickness variation using nominal HUD system parameters. With reference to FIG. 13, it was discovered that the double image angle $\Delta\theta_r$ decreases with thickness. Double image angle $\Delta\theta_r$ is illustrated in FIG. 15. Further, it was found that $\Delta\theta_r$ dependence on the thickness variations (the gradient) is not thickness dependent. Thus, if thickness variations due to manufacturing process scales as a percentage of nominal thickness, then it follows that thinner windshields will have smaller double image angle variation, as exhibited by the variations 70, 72.

Figure 14:
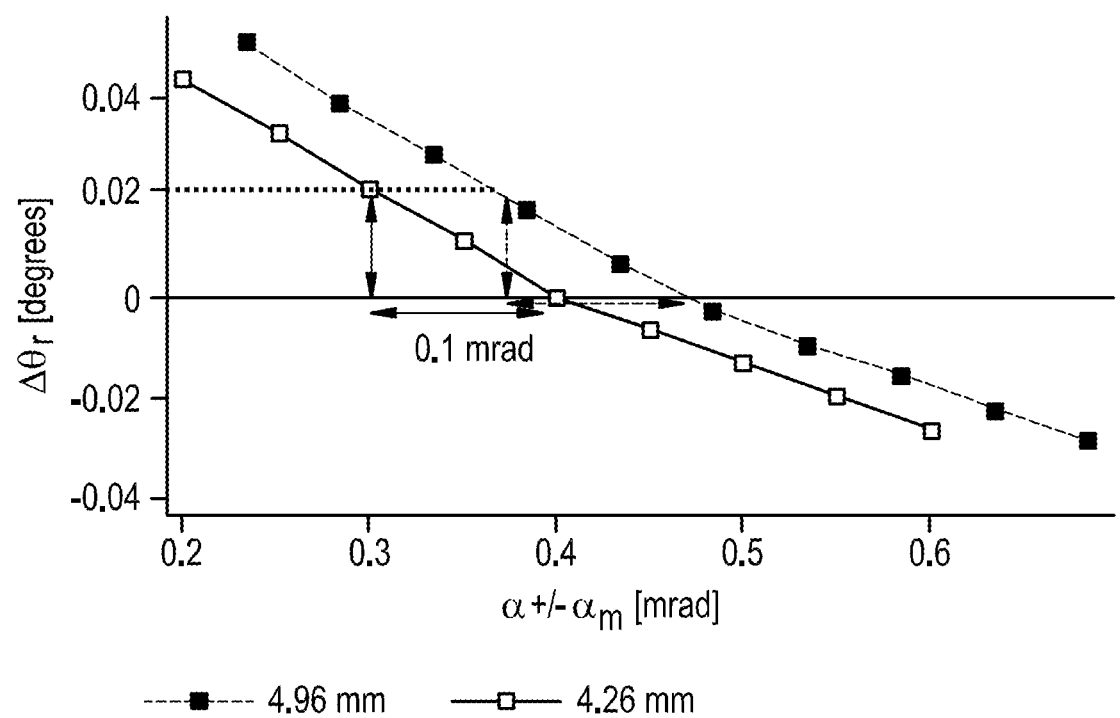
FIG. 14 is a plot of double image angle $\Delta\theta_r$ dependence on wedge angle variation $\alpha$ for nominal HUD system parameters.

FIG. 14 is a plot of double image angle $\Delta\theta_r$ dependence on wedge angle variation α for nominal HUD system parameters. With reference to FIG. 14, it was discovered that the double image angle $\Delta\theta_r$ dependence on the wedge angle variation is not thickness sensitive. For example, for a 0.1 mrad variation in the wedge angle α, the double image angle $\Delta\theta_r$ is approximately 0.02 degrees for both standard thickness (4.96 mm) and reduced thickness (4.26 mm) windshields. It thus follows that if the wedge angle variation due to processing conditions can be reduced proportionally to the value of α, then for a thinner windshield the double image angle variation will be also reduced, proportionally.

In some embodiments, a glass laminate structure is provided comprising a non-chemically-strengthened external glass sheet, a chemically-strengthened internal glass sheet, and at least one polymer interlayer intermediate the external and internal glass sheets, where the internal glass sheet has a thickness ranging from about 0.3 mm to about 1.5 mm, from about 0.5 mm to about 1.5 mm, the external glass sheet has a thickness ranging from about 1.5 mm to about 3.0 mm, and the polymer interlayer has a first edge with a first thickness and a second edge opposite the first edge with a second thickness greater than the first thickness. In another embodiment, the internal glass sheet includes one or more alkaline earth oxides, such that a content of alkaline earth oxides is at least about 5 wt. %. In a further embodiment, the internal glass sheet has a thickness of between about 0.3 mm to about 0.7 mm. In another embodiment, the internal glass sheet can have a surface compressive stress between about 250 MPa and about 900 MPa. Exemplary polymer interlayers can be a single polymer sheet, a multilayer polymer sheet, or a composite polymer sheet. Interlayers can also comprises a material such as, but not limited to, poly vinyl butyral (PVB), polycarbonate, acoustic PVB, ethylene vinyl acetate (EVA), thermoplastic polyurethane (TPU), ionomer, a thermoplastic material, and combinations thereof. In some embodiments, the polymer interlayer has a thickness of between about 0.4 to about 1.2 mm at the first edge. In other embodiments, the external glass sheet comprises a material selected from the group consisting of soda-lime glass and annealed glass. Exemplary glass laminates can find utility as, among other applications, an automotive windshield, sunroof or cover plate.

In additional embodiments, a glass laminate structure is provided comprising a non-chemically-strengthened internal glass sheet, a chemically-strengthened external glass sheet, and at least one polymer interlayer intermediate the external and internal glass sheets, where the external glass sheet has a thickness ranging from about 0.3 mm to about 1.5 mm, from about 0.5 mm to about 1.5 mm, where the internal glass sheet has a thickness ranging from about 1.5 mm to about 3.0 mm, and where the polymer interlayer has a first edge with a first thickness and a second edge opposite the first edge with a second thickness greater than the first thickness. In another embodiment, the external glass sheet includes one or more alkaline earth oxides, such that a content of alkaline earth oxides is at least about 5 wt. %. In a further embodiment, the external glass sheet has a thickness of between about 0.3 mm to about 0.7 mm. In another embodiment, the external glass sheet can have a surface compressive stress between about 250 MPa and about 900 MPa. Exemplary polymer interlayers can be a single polymer sheet, a multilayer polymer sheet, or a composite polymer sheet. Interlayers can also comprises a material such as, but not limited to, poly vinyl butyral (PVB), polycarbonate, acoustic PVB, ethylene vinyl acetate (EVA), thermoplastic polyurethane (TPU), ionomer, a thermoplastic material, and combinations thereof. In some embodiments, the polymer interlayer has a thickness of between about 0.4 to about 1.2 mm at the first edge. In other embodiments, the internal glass sheet comprises a material selected from the group consisting of soda-lime glass and annealed glass. Exemplary glass laminates can find utility as, among other applications, an automotive windshield, sunroof or cover plate.

In further embodiments, a glass laminate structure is provided comprising a chemically-strengthened internal glass sheet, a chemically-strengthened external glass sheet, and at least one polymer interlayer intermediate the external and internal glass sheets, where the external and internal glass sheets each have a thickness ranging from about 0.3 mm to about 1.5 mm, from about 0.5 mm to about 1.5 mm, and where the polymer interlayer has a first edge with a first thickness and a second edge opposite the first edge with a second thickness greater than the first thickness. In another embodiment, the external and internal glass sheets can include one or more alkaline earth oxides, such that a content of alkaline earth oxides is at least about 5 wt. %. In a further embodiment, the internal and external glass sheets can have a thickness of between about 0.3 mm to about 0.7 mm. In another embodiment, the external and internal glass sheets can have a surface compressive stress between about 250 MPa and about 900 MPa. In some of these embodiments, the internal glass sheet or portions thereof can have a surface compressive stress less than the surface compressive stress of the external glass sheet. Exemplary polymer interlayers can be a single polymer sheet, a multilayer polymer sheet, or a composite polymer sheet. Interlayers can also comprises a material such as, but not limited to, poly vinyl butyral (PVB), polycarbonate, acoustic PVB, ethylene vinyl acetate (EVA), thermoplastic polyurethane (TPU), ionomer, a thermoplastic material, and combinations thereof. In some embodiments, the polymer interlayer has a thickness of between about 0.4 to about 1.2 mm at the first edge. Exemplary glass laminates can find utility as, among other applications, an automotive windshield, sunroof or cover plate.

Embodiments of the present disclosure may thus offer a means to reduce the weight of automotive glazing by using thinner glass materials while maintaining optical and safety requirements. Conventional laminated windshields may account for 62% of a vehicle's total glazing weight; however, by employing a 0.7 mm thick chemically-strengthened internal layer with a 2.1 mm thick non-chemically-strengthened external layer, for example, windshield weight can be reduced by 33%. Furthermore, it has been discovered that use of a 1.6 mm thick non-chemically-strengthened external layer with the 0.7 mm thick chemically-strengthened internal layer results in an overall 45% weight savings.

Further, because exemplary glass laminate structures employ strengthened glass sheets as described herein, the strengthened glass sheets are capable of providing required mechanical properties to the glass laminate structures while being thin. The required mechanical properties for the internal glass sheet include mechanical strength and shatter characteristics such as described above, for example. Additionally, use of exemplary laminate structures according to embodiments of the present disclosure may allow a laminated windshield to pass all regulatory safety requirements including resistance to penetration from internal and external objects and appropriate flexure resulting in acceptable Head Impact Criteria (HIC) values. In addition, an exemplary external layer comprised of annealed glass may offer acceptable break patterns caused by external object impacts and allow for continued operational visibility through the windshield when a chip or crack occurs as a result of the impact. Research has also demonstrated that employing chemically-strengthened glass as an interior surface of an asymmetrical windshield provides an added benefit of reduced laceration potential compared to that caused by occupant impact with conventional annealed windshields.

Embodiments of the present disclosure may also offer one or more improved optical properties relative to conventional laminate glass structures, for example for use with a HUD system. For example, certain embodiments may provide an increased area of viewing a displayed image, and other embodiments may provide for improved clarity in the displayed image. Thus, according to one aspect of the present disclosure, a glass laminate structure can be provided that incorporates such advantages in an exemplary glass laminate structure, e.g. as part of a HUD system.

Referring to FIG. 15, a diagram illustrating a non-limiting exemplary use of a glass laminate structure according to the present disclosure as an automotive windshield as part of a HUD system is illustrated. The diagram illustrates a vehicle including a windshield that is employed as a transparent HUD display screen, i.e., a display screen that allows a viewer to see a background image through the display screen while viewing a display image on the display screen. The windshield can include any of the glass laminate structures of the present disclosure. For example, the glass laminate windshield may comprise a non-strengthened external glass sheet, a strengthened internal glass sheet, and at least one polymer interlayer intermediate the external and internal glass sheets. In a further exemplary embodiment, the glass laminate structure may comprise a strengthened external glass sheet, a non-strengthened internal glass sheet, and at least one polymer interlayer intermediate the external and internal glass sheets. In yet a further exemplary embodiment, the glass laminate structure may comprise a strengthened external glass sheet, a strengthened internal glass sheet, and at least one polymer interlayer intermediate the external and internal glass sheets.

The mechanism by which a double image is generated on the transparent display screen is illustrated. A projector unit for a HUD system may be provided, e.g. at an upper portion of the dashboard, to project at least one illumination light to the glass laminate structure, e.g windshield, and rays of an illumination light from a common object point (a point light source) can impinge on the transparent display screen, which can be the interior surface of a glass laminate structure, e.g. a windshield, that has a rake angle $\alpha_r$. The rake angle $\alpha_r$ (or the "installation angle") is the angle between the vertical direction and a two-dimensional plane that tangentially contacts the interior surface of the windshield. The incidence angle (or the "projector incidence angle") θ of the ray of the illumination light is the angle between the ray of the illumination light and the surface normal of the strengthened internal glass sheet. The look down angle $\alpha_0$ is the angle between a horizontal plane and the direction of view for a viewer (such as a driver) for a reflected beam that is reflected off the first reflective surface, i.e., the downward deviation of the angle from the horizontal plane when the viewer looks at the point on the display screen that corresponds to the point of incidence of the ray of illumination light at the interior surface of the glass laminate structure. The incidence angle θ of is the same as the sum of the rake angle $\alpha_r$ and a look down angle $\alpha_0$.

A double image will be formed from a first reflection from a first reflective surface and a second reflection from a second reflective surface. To an observer (e.g. a viewer inside an automotive), the path of the ray of light that is reflected off the second reflective surface is different from the path of the ray of light that is reflected off the first reflective surface by a differential in the look down angle $\alpha_0$. The differential in the look down angle $\alpha_0$ is herein referred to as a double image angle $\Delta\theta_r$ as shown in FIG. 15.

To the observer, the two optical paths generate two images that are spatially separated by the double image angle $\Delta\theta_r$. As discussed above, the double images appear from an offset in the location of images reflected from the first and second reflective surfaces of the strengthened internal glass sheet. Specifically, images appear to come from two different virtual object positions that are located in front of the observer. The distance between the observer and the virtual objects is herein referred to as a virtual image distance L. The double images appear to be separated by a separation distance at the apparent object location. The separation distance between the observer and the apparent object location is the virtual image distance L. The separation distance of the double images is herein referred to as a double image offset d. The double image offset d is given by the formula: $d \approx 2 \times L \times \tan(\Delta\theta_r/2)$. The virtual image distance L can be, for example, about 2.0 to 2.5 m, such as about 2.2 m, although lesser and greater virtual image distances are possible.

Figure 16:
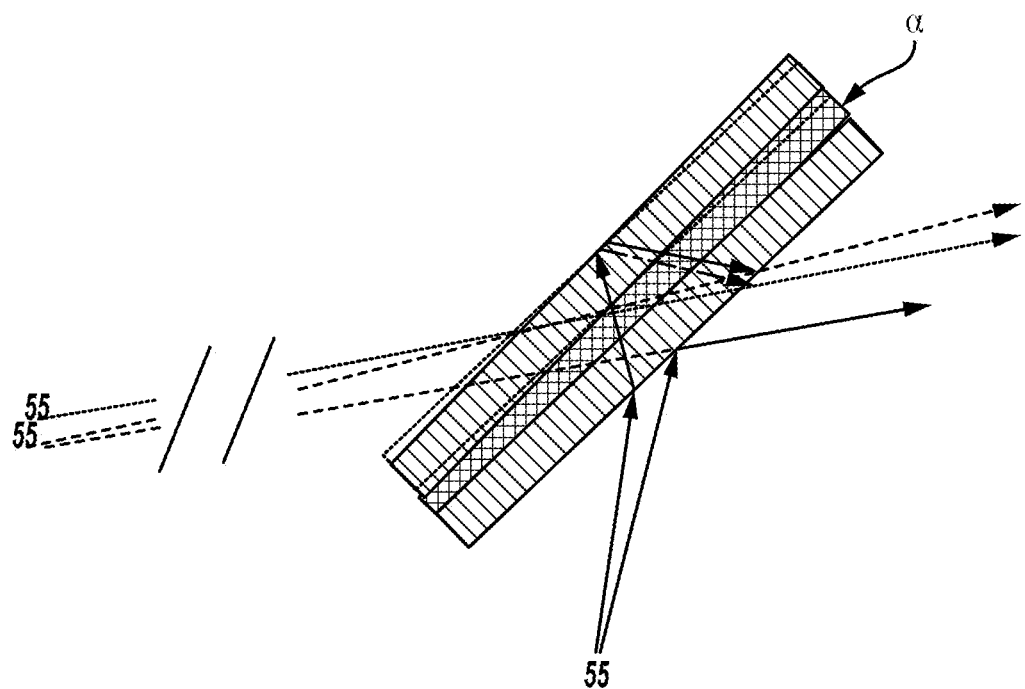
FIG. 16 is a diagram illustrating the mechanism for apparent image convergence at a virtual object.

FIG. 16 is a diagram illustrating the mechanism for apparent image convergence at a virtual object. Uncorrected double images due to the two reflections appear to originate from a common point to an observer due to the non-zero double image angle $\Delta\theta_r$. The common point is in front of the observer, and is spaced from the observer by the virtual image distance L. The corrected double images appear to come from the point of a virtual object located at the virtual image distance when the observer's brain interprets the double images as two images coming from a single object (i.e., the virtual object) to produce a high quality compound image.

Figure 17:
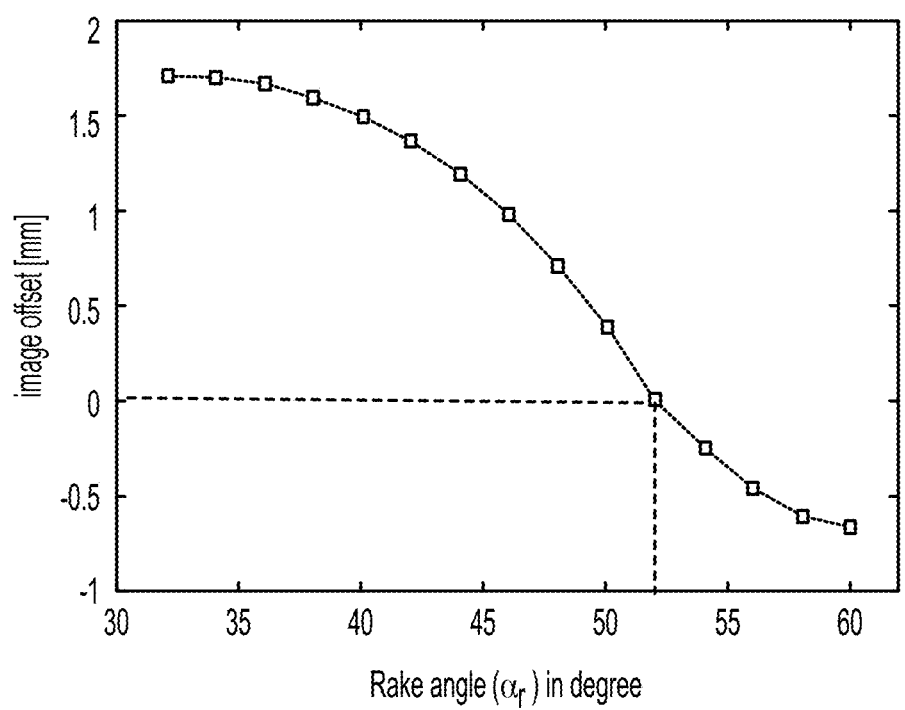
FIG. 17 is a graph illustrating image offset between a pair of images as a function of a rake angle for a given point on a transparent display screen.

Referring to FIG. 17, the double image offset d between the exemplary pair of double images in FIG. 16 is plotted as a function of the rake angle $\alpha_r$ for a given point on a transparent display screen. Assumptions for calculating the plotted double image offset distance d are as follows:

Windshield radius: $R_c$=8,301 mm,
Distance to source: $R_i$=1,000 mm,
Virtual image distance: L=2.2 m,
Refractive index of the internal and external glass sheets: n=1.52, Angle of incidence: $\theta=40°-70°$,
Wedge angle: $\alpha=0.467$ mrad,
Thickness of the windshield: 4.96 mm.

The windshield radius $R_c$ refers to the radius of curvature of the interior surface of the windshield. The wedge angle $\alpha$ refers to the angle between a first plane including the interface between the polymer layer and the strengthened internal glass sheet and a second plane including the interface between the polymer layer and the external glass sheet. For a given incidence angle and a given wedge angle, the double images are fully corrected at a single value of the rake angle. However, the double images cannot be corrected for a range of incidence angles to eliminate the double image angle $\Delta\theta_r$. In other words, the double image angle $\Delta\theta_r$ cannot be maintained at zero over a range of incidence angles.

Figure 18:
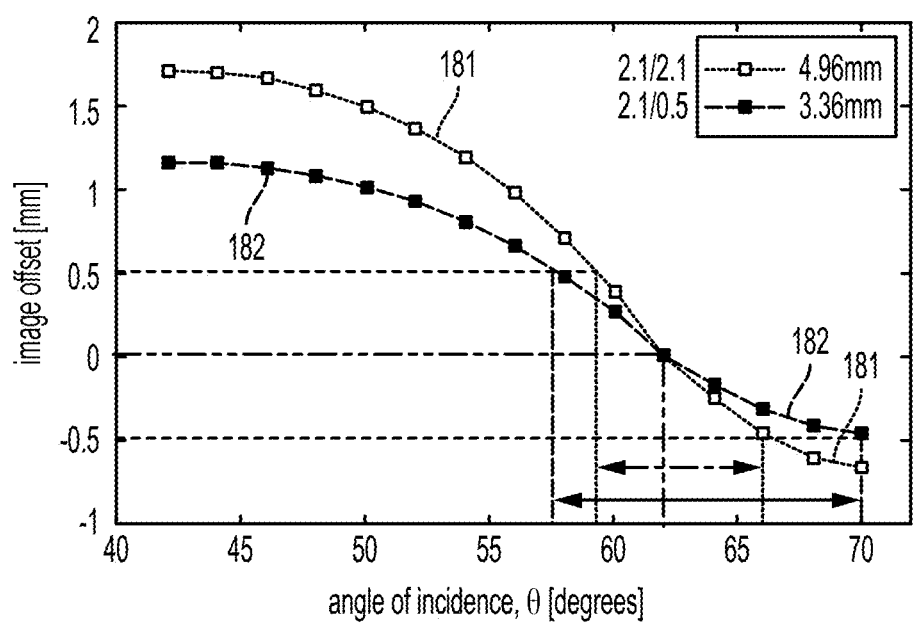
FIG. 18 is a graph comparing the image offset in a dual image for two exemplary glass laminate structures having different thicknesses for an internal glass sheet.

According to certain embodiments of the disclosure, the double images are shown to be sufficiently corrected over a broader range of incidence angles to provide significantly improved optical viewing properties in an image display region, i.e. a region of the glass laminate structure onto which the HUD image is viewed by an observer. For example, as seen in FIG. 18, the double image offset d, i.e., the offset distance in the dual image, is plotted for two glass laminate structures having different thicknesses for a strengthened internal glass sheet. The horizontal axis represents the angle of incidence θ for the illumination light. The vertical axis labeled "image offset" represents the double image offset d. A first conventional glass laminate structure has a total thickness of about 4.96 mm, and includes a non-strengthened internal glass sheet having a thickness of about 2.1 mm within a display region, a non-strengthened external glass sheet having a thickness of about 2.1 mm within the display region, and a 0.76 mm polymer interlayer therebetween. A second exemplary glass laminate structure according to the disclosure has a total thickness of about 3.36 mm, and includes a strengthened internal glass sheet having a thickness of about 0.5 mm within a display region, a non-strengthened external glass sheet having a thickness of about 2.1 mm within the display region, and a 0.76 mm polymer interlayer therebetween.

The double image offset d for the first conventional glass laminate structure is plotted as a function of the angle of incidence θ by a first curve 181, and the double image offset d for the second exemplary glass laminate structure is plotted as a function of the angle of incidence θ by a second curve 182. The second exemplary glass laminate structure demonstrates superior optical performance relative to the first glass laminate structure by providing a higher quality compound image over a broader range of incidence angles. Thus, according to one aspect of the present disclosure, a glass laminate structure can be provided in a manner that incorporates improved optical properties such as seen in the second exemplary glass laminate structure.

The optical performance of the second exemplary glass laminate structure of FIG. 18 includes, for example, a double image offset between a pair of double images that is less than about 0.5 mm in magnitude for an entire range of the angle of incidence for an illuminating light that spans greater than at least about 8 degrees, such as greater than at least about 9 degrees, at least about 10 degrees, at least about 11 degrees, or at least about 12 degrees, which can be, for example, from about 57.5 degrees to about 70 degrees. In contrast, the range of incidence angles that provide a double image offset less than about 0.5 mm in magnitude for the first conventional glass laminate structure of FIG. 18 is from about 59 degrees to about 66.5 degrees, which corresponds to a smaller display region.

In one embodiment, the entire range of the angle of incidence can include at least a range from about 61 degrees to about 63 degrees. In another embodiment, the entire range of the angle of incidence can include at least a range from about 60 degrees to about 65 degrees. In another embodiment, the entire range of the angle of incidence can include at least a range from about 58 degrees to about 70 degrees.

In one embodiment, the double image offset can be less than about 1 mm for an entirety of a range of the angle of incidence for the illuminating light from about 52.5 degrees to about 70 degrees or greater.

Figure 19:
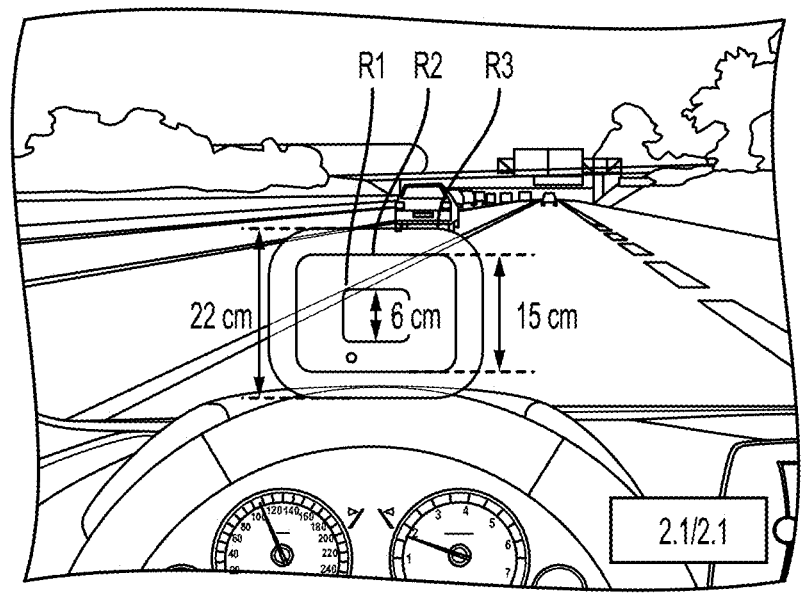
FIG. 19 is a schematic illustration of sharp viewing areas for a first exemplary glass laminate structure having a thick internal glass sheet.
Figure 20:
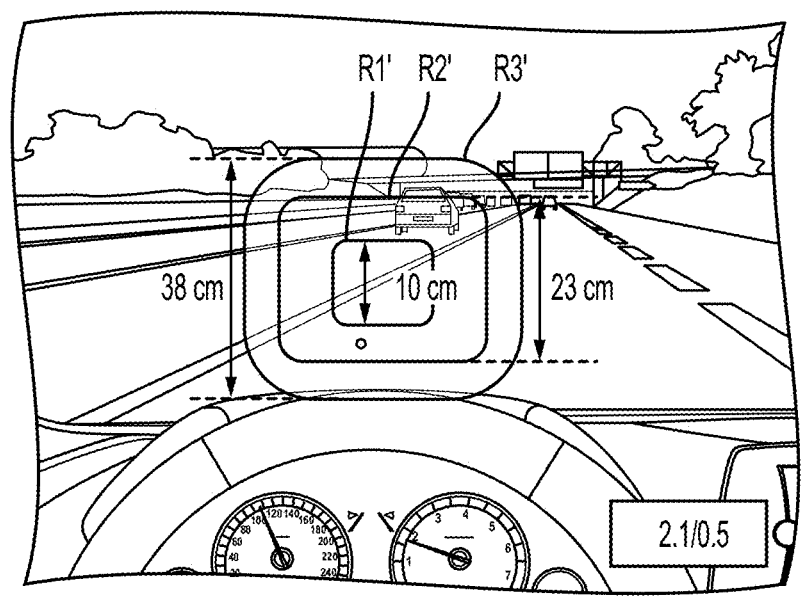
FIG. 20 is a schematic illustration of sharp viewing areas for a second exemplary glass laminate structure having a thin internal glass sheet.

FIGS. 19 and 20 demonstrate contrast in viewing areas between a first conventional glass laminate structure and a second exemplary glass laminate structure, respectively, as described above with regard to FIG. 18. Three substantially rectangular areas are illustrated on each windshield of FIGS. 19 and 20. The three substantially rectangular areas (R1, R2, R3) in FIG. 19, from innermost to outermost, correspond to the areas in which the double image offset is less than about 0.1 mm in magnitude (R1), less than or equal to about 0.2 mm in magnitude (R2), and less than or equal to about 0.4 mm in magnitude (R3) for a windshield incorporating the first exemplary glass laminate structure. The three substantially rectangular areas (R1', R2', R3') in FIG. 20, from innermost to outermost, correspond to the areas in which the double image offset is less than about 0.1 mm in magnitude (R1'), less than or equal to about 0.2 mm in magnitude (R2'), and less than or equal to about 0.4 mm in magnitude (R3') for a windshield incorporating the second exemplary glass laminate structure. The increased viewing area seen in FIG. 20 relative to FIG. 19, which is a result of the wider incidence angle range, demonstrates an optical advantage of using glass laminate structures according to the disclosure in a HUD display system.

As shown by FIG. 20, the double image offset is less than 0.4 mm in magnitude within an entire area of a display area of the automotive windshield having a vertical extent greater than 30 cm. For example, the vertical extent of the outermost rounded rectangle is 38 cm. As also shown, the double image offset is less than 0.2 mm in magnitude within an entire area of a display area of the automotive windshield having a vertical extent greater than 15 cm. For example, the vertical extent of the outermost rounded rectangle is 23 cm. As also shown, the double image offset is less than 0.1 mm in magnitude within an entire area of a display area of the automotive windshield having a vertical extent greater than 8 cm. For example, the vertical extent of the outermost rounded rectangle is 10 cm. This example thus demonstrates that a glass laminate structure according to the disclosure having an internal glass sheet of approximately 25% thickness of a corresponding internal glass sheet of a conventional glass laminate surprisingly can provide an increase in display area of greater than about 40%, greater than about 50%, greater than about 60%, or even greater than about 70%, of the total viewing area compared to the conventional glass laminate structure of FIG. 19.

Thus, as shown, the use of a thinner glass sheet for the strengthened glass sheet of the glass laminate structure according to the present disclosure generally provides a larger viewing field at the same sharpness limit of the ghost image relative to conventional glass laminate structures not according to the disclosure, e.g. such as those having a thickness of a strengthened internal glass sheet approximately the same as the thickness of an external non-strengthened glass sheet.

Additionally, glass laminate structures according to various embodiments of the disclosure can provide a significant improvement in clarity of a displayed image by providing a reduction in ghost or double image. The reduction in double image (measured in terms of the double image offset d) may be greater than about 40%, such as greater than about 50%, greater than about 60%, greater than about 70%, or greater than about 80%, according to various embodiments, relative to conventional glass laminate structures not according to the disclosure, e.g. such as those having a thickness of a strengthened internal glass sheet approximately the same as the thickness of an external non-strengthened glass sheet.

Figure 21:
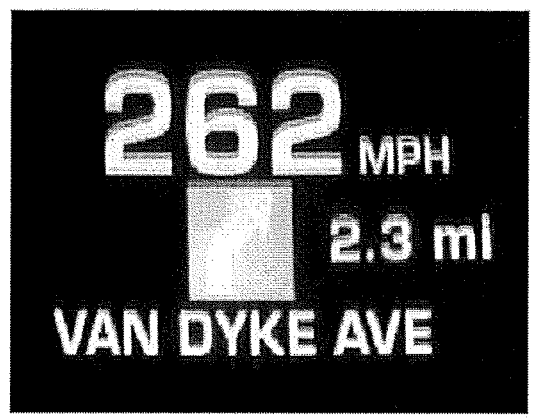
FIG. 21 is an illustration of a display image for a conventional glass laminate structure.
Figure 22:
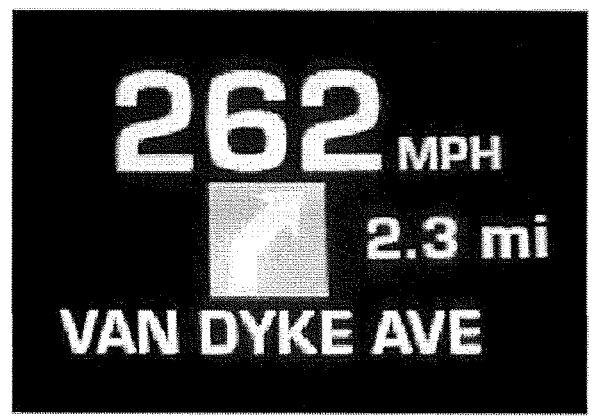
FIG. 22 is an illustration of an exemplary display image for an exemplary glass laminate structure according to one embodiment of the disclosure.

For example, FIGS. 21 and 22 compare exemplary display images generated with the first comparative glass laminate structure and second exemplary glass laminate structure of FIG. 18. FIG. 21 is a camera capture of an actual HUD display image on the first conventional glass laminate structure, and FIG. 22 is a camera capture of an actual HUD display image on the second exemplary glass laminate structure. The image in FIG. 21 shows that the effect of the ghost image in the conventional glass laminate structure is about 10 camera pixels, and the image in FIG. 22 shows that the effect of the ghost image in a glass laminate structure according to the disclosure is about 3 camera pixels within the worst performance regions of the two display areas, which are the same in physical size. The image on the second exemplary glass laminate structure of FIG. 22, provided according to the disclosure, demonstrates superior performance relative to the image on the first exemplary glass laminate structure of FIG. 21, in terms of clarity of image. In this embodiment, for example, a reduction of approximately 70% in ghost image is achieved relative to a conventional glass laminate structure.

In various embodiments, the optical advantages demonstrated when the glass laminate structure has a non-strengthened glass sheet with a thickness of greater than about 1.5 mm, such as about 2 mm or greater, may not be present in embodiments when the strengthened glass sheet has a thickness on the order of about 1.5 mm or greater, such as about 2 mm or greater, or about 1.5 to about 3.0 mm. However, as shown, such optical advantages are demonstrated when the glass laminate structure includes a thinner strengthened glass sheet such as the internal glass sheet of the second exemplary glass laminate structure described above, e.g. having a thickness on the order of less than about 2 mm, less than about 1.75 mm, or less than about 1.5 mm, such as about 0.3 mm to about 1.5 mm, about 0.5 mm to about 1 mm, or about 0.3 mm to about 0.7 mm. In one embodiment, the strengthened glass sheet may have approximately half the thickness of the non-strengthened glass sheet, or less. In other embodiments, the strengthened glass sheet has a thickness that is less than about 75%, less than about 50%, or less than about 25% of the thickness of the non-strengthened glass sheet.

Methods for bending and/or shaping glass laminate structures as described herein can include gravity bending, press bending and methods that are hybrids thereof. In a traditional method of gravity bending thin, flat sheets of glass into curved shapes such as automotive windshields, cold, pre-cut single or multiple glass sheets are placed onto the rigid, pre-shaped, peripheral support surface of a bending fixture. The bending fixture may be made using a metal or a refractory material. In an exemplary method, an articulating bending fixture may be used. Prior to bending, the glass typically is supported only at a few contact points. The glass is heated, usually by exposure to elevated temperatures in a lehr, which softens the glass allowing gravity to sag or slump the glass into conformance with the peripheral support surface. Substantially the entire support surface generally will then be in contact with the periphery of the glass.

A related technique is press bending where a single flat glass sheet is heated to a temperature corresponding substantially to the softening point of the glass. The heated sheet is then pressed or shaped to a desired curvature between male and female mold members having complementary shaping surfaces. The mold member shaping surfaces may include vacuum or air jets for engaging with the glass sheets. In embodiments, the shaping surfaces may be configured to contact substantially the entire corresponding glass surface. Alternatively, one or both of the opposing shaping surfaces may contact the respective glass surface over a discrete area or at discrete contact points. For example, a female mold surface may be ring-shaped surface. In embodiments, a combination of gravity bending and press bending techniques can be used.

A total thickness of the glass laminate structure can range from about 2 mm to 5 mm, with the external and/or internal chemically-strengthened glass sheets having a thickness of 1 mm or less (e.g., from 0.3 to 1 mm such as, for example, 0.3, 0.5, 0.6, 0.7, 0.8, 0.9 or 1 mm). Further, the internal and/or external non-chemically-strengthened glass sheets can have a thickness of 2.5 mm or less (e.g., from 1 to 2 mm such as, for example, 1, 1.5, 2 or 2.5 mm) or may have a thickness of 2.5 mm or more. In embodiments, the total thickness of the glass sheets in the glass laminate is less than 3.5 mm (e.g., less than 3.5, 3, 2.5 or 2.3 mm).

Applicants have shown that the glass laminate structures disclosed herein have excellent durability, impact resistance, toughness, and scratch resistance. As is well known among skilled artisans, the strength and mechanical impact performance of a glass sheet or laminate is limited by defects in the glass, including both surface and internal defects. When a glass laminate structure is impacted, the impact point is put into compression, while a ring or "hoop" around the impact point, as well as the opposite face of the impacted sheet, are put into tension. Typically, the origin of failure will be at a flaw, usually on the glass surface, at or near the point of highest tension. This may occur on the opposite face, but can occur within the ring. If a flaw in the glass is put into tension during an impact event, the flaw will likely propagate, and the glass will typically break. Thus, a high magnitude and depth of compressive stress (depth of layer) is preferable.

Due to strengthening, one or both of the surfaces of the strengthened glass sheets used in the disclosed hybrid glass laminates are under compression. The incorporation of a compressive stress in a near surface region of the glass can inhibit crack propagation and failure of the glass sheet. In order for flaws to propagate and failure to occur, the tensile stress from an impact must exceed the surface compressive stress at the tip of the flaw. In embodiments, the high compressive stress and high depth of layer of strengthened glass sheets enable the use of thinner glass than in the case of non-chemically-strengthened glass.

In the case of hybrid glass laminate structures, the laminate structure can deflect without breaking in response to the mechanical impact much further than thicker monolithic, non-chemically-strengthened glass or thicker, non-strengthened glass laminates. This added deflection enables more energy transfer to the laminate interlayer, which can reduce the energy that reaches the opposite side of the glass. Consequently, the hybrid glass laminates disclosed herein can withstand higher impact energies than monolithic, non-strengthened glass or non-chemically-strengthened glass laminates of similar thickness.

In addition to their mechanical properties, as will be appreciated by a skilled artisan, laminated structures can be used to dampen acoustic waves. The hybrid glass laminates disclosed herein can dramatically reduce acoustic transmission while using thinner (and lighter) structures that also possess the requisite mechanical properties for many glazing applications.

The acoustic performance of laminates and glazings is commonly impacted by the flexural vibrations of the glazing structure. Without wishing to be bound by theory, human acoustic response peaks typically between 500 Hz and 5000 Hz, corresponding to wavelengths of about 0.1-1 m in air and 1-10 m in glass. For a glazing structure less than 0.01 m (<10 mm) thick, transmission occurs mainly through coupling of vibrations and acoustic waves to the flexural vibration of the glazing. Laminated glazing structures can be designed to convert energy from the glazing flexural modes into shear strains within the polymer interlayer. In glass laminates employing thinner glass sheets, the greater compliance of the thinner glass permits a greater vibrational amplitude, which in turn can impart greater shear strain on the interlayer. The low shear resistance of most viscoelastic polymer interlayer materials means that the interlayer will promote damping via the high shear strain that will be converted into heat under the influence of molecular chain sliding and relaxation.

In addition to the glass laminate thickness, the nature of the glass sheets that comprise the laminates may also influence the sound attenuating properties. For instance, as between strengthened and non-strengthened glass sheets, there may be small but significant difference at the glass-polymer interlayer interface that contributes to higher shear strain in the polymer layer. Also, in addition to their obvious compositional differences, aluminosilicate glasses and soda lime glasses have different physical and mechanical properties, including modulus, Poisson's ratio, density, etc., which may result in a different acoustic response.

While this description may include many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and may even be initially claimed as such, one or more features from a claimed combination may in some cases be excised from the combination, and the claimed combination may be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

As shown by the various configurations and embodiments illustrated in the figures, various glass laminate structures for head-up displays have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A glass laminate structure comprising:
a non-strengthened glass sheet;
a strengthened glass sheet; and
at least one polymer interlayer intermediate the non-strengthened and strengthened glass sheets;
wherein the glass laminate structure exhibits a double image offset that is less than 0.5 mm for a range of an angle of incidence for an illuminating light that spans from 8 degrees to 12.5 degrees; and
wherein the double image offset is less than 1 mm in magnitude for an entirety of a range of the angle of incidence for the illuminating light ranging from 52.5 degrees to 70 degrees.

2. The glass laminate structure of claim 1, wherein the angle of incidence spans at least 10 degrees.

3. The glass laminate structure of claim 1, wherein:
the strengthened glass sheet has a thickness ranging from 0.3 mm to 1.5 mm; and
the non-strengthened glass sheet has a thickness ranging from 1.5 mm to 3.0 mm, wherein the thickness of the strengthened glass sheet is less than the thickness of the non-strengthened glass sheet.

4. The glass laminate structure of claim 3, wherein the thickness of the strengthened glass sheet is in a range from 0.3 mm to 0.7 mm.

5. The glass laminate structure of claim 1, wherein a thickness of the strengthened glass sheet is less than 75% of a thickness of the non-strengthened glass sheet.

6. The glass laminate structure of claim 1, wherein a thickness of the strengthened glass sheet is less than one half of a thickness of the non-strengthened glass sheet.

7. The glass laminate structure of claim 1, wherein the strengthened glass sheet includes one or more alkaline earth oxides, wherein the content of alkaline earth oxides is at least 5 wt. %.

8. The glass laminate structure of claim 1, wherein the strengthened glass sheet has a surface compressive stress ranging from 250 MPa to 900 MPa.

9. The glass laminate structure of claim 1, wherein the non-strengthened glass sheet comprises a material selected from the group consisting of soda-lime glass and annealed glass.

10. The glass laminate structure of claim 1, wherein the strengthened glass sheet comprises a maximum surface perturbation of less than 0.05 µm, as measured along a linear distance of 10 mm.

11. The glass laminate structure of claim 1, wherein:
the glass laminate structure is an automotive windshield;
the strengthened glass sheet is an internal glass sheet;
the non-strengthened glass sheet is an external glass sheet;
the automotive windshield comprises an image display region; and
the double image offset is less than 0.4 mm in magnitude within an area of the image display region of the automotive windshield having a vertical extent greater than 30 cm.

12. The glass laminate structure of claim 11, wherein the double image offset is less than 0.1 mm in magnitude within an entire area of another display area of the automotive windshield having a vertical extent greater than 8 cm.

13. The glass laminate structure of claim 1, wherein the polymer interlayer comprises a material selected from the group consisting of poly vinyl butyral (PVB), polycarbonate, an acoustic PVB, ethylene vinyl acetate (EVA), a thermoplastic polyurethane (TPU), an ionomer, a thermoplastic material, and combinations thereof.

14. The glass laminate structure of claim 1, wherein the polymer interlayer is wedge-shaped.

15. The glass laminate structure of claim 1,
wherein a thickness of the strengthened glass sheet is less than one half of a thickness of the non-strengthened glass sheet, and
wherein the glass laminate structure provides a reduction in ghost image of greater than 50% compared to a glass laminate structure comprising a strengthened glass sheet having substantially the same thickness as the non-strengthened glass sheet.

16. The glass laminate structure of claim 15, wherein the glass laminate structure provides a reduction in ghost image of greater than 70% compared to a glass laminate structure comprising a strengthened glass sheet having substantially the same thickness as the non-strengthened glass sheet.

* * * * *